US010778325B2

(12) United States Patent
Haley et al.

(10) Patent No.: US 10,778,325 B2
(45) Date of Patent: Sep. 15, 2020

(54) COMMUNICATION SYSTEM AND METHOD

(71) Applicant: Myriota Pty Ltd, Adelaide (AU)

(72) Inventors: David Victor Lawrie Haley, Adelaide (AU); John Lawrence Buetefuer, Adelaide (AU); Alexander James Grant, Adelaide (AU); William George Cowley, Adelaide (AU); Gottfried Lechner, Adelaide (AU); Ingmar Rudiger Land, Adelaide (AU); Robert George McKilliam, Adelaide (AU); Andre Pollok, Adelaide (AU); Linda Mary Davis, Adelaide (AU); Ricky Rocco Luppino, Adelaide (AU); Sorin Adrian Barbulescu, Adelaide (AU)

(73) Assignee: Myriota Pty Ltd, Adelaide, South Australia (AU)

( * ) Notice: Subject to any disclaimer, the term of this patent is extended or adjusted under 35 U.S.C. 154(b) by 0 days.

(21) Appl. No.: 16/436,832

(22) Filed: Jun. 10, 2019

(65) Prior Publication Data

US 2020/0028576 A1    Jan. 23, 2020

Related U.S. Application Data

(63) Continuation of application No. 15/877,246, filed on Jan. 22, 2018, now Pat. No. 10,320,469, which is a
(Continued)

(30) Foreign Application Priority Data

Sep. 21, 2012    (AU) ................. 2012904130

(51) Int. Cl.
*H04B 7/185*    (2006.01)
*H04B 7/212*    (2006.01)
*H04W 40/20*    (2009.01)

(52) U.S. Cl.
CPC ......... *H04B 7/18513* (2013.01); *H04B 7/185* (2013.01); *H04B 7/18504* (2013.01);
(Continued)

(58) Field of Classification Search
CPC .......................... H04B 7/185; H04B 7/18504; H04B 7/18513; H04B 7/18517; H04B 7/18563;
(Continued)

(56) References Cited

U.S. PATENT DOCUMENTS 6,020,845 A    2/2000    Weinberg et al.
6,081,710 A    6/2000    Sherman et al.
(Continued)

FOREIGN PATENT DOCUMENTS

EP    1067712 A2    1/2001
EP    1278310 A2    1/2003
(Continued)

OTHER PUBLICATIONS

European Satellite AIS under joint EMSA/ESA Integrated Applicatons Programme, Carsten Tobehn et al., IAC-11-B4.4.2—62nd International Astronautical Congress Cape Town, 10 pages, 2011.
(Continued)

*Primary Examiner* — Raymond S Dean
(74) *Attorney, Agent, or Firm* — McDonnell Boehnen Hulbert & Berghoff LLP

(57) ABSTRACT

A communication system is disclosed. In an embodiment, the communication system includes a user node for receiving data from a remote application program, the data including message data for communication to a central application program operatively associated with the remote application program; plurality of geographically distributed gateway nodes; one or more access nodes for receiving the message data from the user node via a first communications interface, and communicating the message data via a second commu-
(Continued)

| | | |
|---|---|---|
| WO | WO 2001/078256 A1 | 10/2001 |
| WO | 2007/143478 | 12/2007 |
| WO | 2010/053909 A1 | 5/2010 |
| WO | 2010/060839 A1 | 6/2010 |
| WO | WO 2012/114161 A1 | 8/2012 |

OTHER PUBLICATIONS

International Astronautical Congress, https://en.wikipedia.org/wiki/International_Astronautical_Congress (https://protect-us.mimecast.com/s/zW8kCpYo5xSGNLXhPxZO1?domain=en.wikipedia.org),3 pages, 2012.

Performance of AIS sensors in space—PASTA-MARE project final report executive summary https://webgate.ec.europa.eu/maritimeforum/en/node/1618 (https://protect-us.mimecast.com/s/uhnHCqxp4ycDPrmuXv09O?domain=webgate.ec.europa.eu), 14 pages, 2011.

Software defined radio, Wikipedia, https://en.wikipedia.org/wiki/Software-defined_radio (https://protect-us.mimecast.com/s/ptbLCrkq4zHp0jLC4vEQ9?, 7 pages, 2012.

Space-Based Automatic Dependent Surveillance Broadcast (ADS-B) Payload for in Orbit Demonstration, Helmut Blomenhofer et al.—2012 6th Advanced Satellite Multimedia Systems Conference 9ASMS) and 12th Signal processing for Space Communications Workshop (SPSC), 6 pages, 2012.

A Norwegian Satellite for Space-Based observations of AIS in the High North, Bjorn T. Narheim et al., Proc., 22nd Annual AIAA/USU Conference on Small Satellites, Logan, Utah, Aout 2008, 6 pages.

Satellite Detection of AIS-SART-EPIRB Sea Trials, Jim King, 2010 Beacon Manufacturers Workshop, San Diego, May 21, 2010, https://web.archive.org/web/20120329050535/https://222.sarsat.noaa.gov/BMS%202010_files/AIS-SART%20SeaTrials-BMW_IKino_21May10.pdf (https://protect-us.mimecast.com/s/WD7zCERXonumjGRIkjyW9?domain=web.archive.org), 29 pages, May 21, 2010.

Guidance Material on Processing and Display of ADS-B Data at Air Traffic Controller Positions, ICAO Asia and Pacific office, APANPIRG/21 Appendix O to the Report on agenda Item 3.4, 15 pages, Sep. 2010.

"OSI model," Wikipedia, https://en.wikipedia.org/wiki/OSI_model (https://protect-us.mimecast.com/s/LwNsCxkz4jHy40ruWr-pT?domain=en.wikipedia.org), 10 pages, 2012.

Fountain code, Wikipedia, https://en.wikipedia.org/wiki/Fountain_code (https://protect-us.mimecast.com/s/c0ZQCyPAgKsgzW9TPOkNB?domain=en.wikipedia.org), 3 pages, 2011.

Extended European Search Report issued in co-pending European Patent Application No. 13838792.3 European Patent Office, dated May 10, 2016, 7 pages.

Mandal P., et al., "On the Underwater Wireless Network Clustering," Centre for Development of Telematics, New Delhi, India, Indian Institute of Technology Delhi, Electrical Eng. Department, New Delhi, India, 2012 Eighteenth National Conference on Communications (NCC), Feb. 3-5, 2012, Kharagpur, India.

Ahlswede, Rudolph et al., "Identification via channels," IEEE Transactions on Information Theory (1989) vol. 35(1), pp. 15-29.

International Preliminary Report on Patentability issued in co-pending International Patent Application No. PCT/AU2013/001078, dated Mar. 24, 2015, pp. 1-6.

Sharing The UHF Between Space and Terrestrial Services, John L. Hult, Sep. 1970.

\* cited by examiner nications interface to one or more of the plurality of geographically distributed gateway nodes; and a hub for communicating with the one or more of the plurality of geographically distributed gateway nodes to receive the message data for communication to the central application.

30 Claims, 9 Drawing Sheets

Related U.S. Application Data continuation of application No. 14/430,096, filed as application No. PCT/AU2013/001078 on Sep. 20, 2013, now Pat. No. 9,923,624.

(52) U.S. Cl.
CPC ..... *H04B 7/18517* (2013.01); *H04B 7/18563* (2013.01); *H04B 7/212* (2013.01); *H04W 40/20* (2013.01); *Y02D 70/00* (2018.01); *Y02D 70/164* (2018.01); *Y02D 70/38* (2018.01); *Y02D 70/446* (2018.01)

(58) Field of Classification Search
CPC ....... H04B 7/212; H04W 40/20; Y02D 70/00; Y02D 70/38; Y02D 70/164; Y02D 70/446
See application file for complete search history.

(56) References Cited

U.S. PATENT DOCUMENTS

| | | | |
|---|---|---|---|
| 6,253,080 | B1 | 6/2001 | Wiedeman et al. |
| 6,272,339 | B1 | 8/2001 | Wiedeman |
| 6,505,046 | B1 | 1/2003 | Baker |
| 7,633,896 | B2 | 12/2009 | Doshi et al. |
| 2003/0027524 | A1 | 2/2003 | Hisashi et al. |
| 2003/0041142 | A1 | 2/2003 | Zhang et al. |
| 2004/0242261 | A1 | 12/2004 | Fette |
| 2005/0014499 | A1 | 1/2005 | Knoblach et al. |
| 2005/0055407 | A1* | 3/2005 | Tandler ............... H04L 51/00 709/206 |
| 2006/0189275 | A1 | 8/2006 | Karabinis |
| 2007/0100682 | A1* | 5/2007 | Kazali ............... G06Q 30/02 705/7.32 |
| 2008/0019297 | A1 | 1/2008 | Walker et al. |
| 2009/0154395 | A1 | 6/2009 | Park et al. |
| 2009/0239466 | A1 | 9/2009 | Saitou et al. |
| 2009/0267792 | A1 | 10/2009 | Crichlow |
| 2010/0322125 | A1 | 12/2010 | Lee et al. |
| 2011/0015852 | A1 | 1/2011 | Blomenhofer |
| 2011/0082918 | A1 | 4/2011 | Karaoguz |
| 2011/0294502 | A1 | 12/2011 | Oerton |
| 2013/0035033 | A1 | 2/2013 | Sanneck et al. |
| 2013/0077562 | A1 | 3/2013 | Boltz et al. |
| 2013/0250773 | A1 | 9/2013 | Ohta et al. |

FOREIGN PATENT DOCUMENTS

| | | |
|---|---|---|
| EP | 1517493 A2 | 3/2005 |
| EP | 2296128 | 3/2011 |
| JP | 2002101228 | 4/2002 |
| JP | 2002101228 A | 4/2002 |
| JP | 2006229696 A | 8/2006 |

(front view)

(top down view)

(top down view)  (front view)

ially associated with the remote application program;
b. a plurality of geographically distributed gateway nodes;
c. one or more access nodes for receiving the message data from the user node via a first communications interface, and communicating the message data via a second communications interface to one or more of the plurality of geographically distributed gateway nodes; and
d. a hub for communicating with the one or more of the plurality of geographically distributed gateway nodes to receive the message data for communication to the central application program.

According to a second aspect of the present invention there is provided a communication system, including:
a. a central application program operatively associated with one or more remote application programs;
b. a plurality of geographically distributed gateway nodes;
c. a hub for receiving data from the central application program for communication to the one or more remote application programs and communicating the received data to a selected one or more of the plurality of geographically distributed gateway nodes; and
d. one or more access nodes for receiving the data from the selected one or more of the geographically distributed gateway nodes using a first communications interface, and communicating the received data to the one or more remote application programs using a second communications interface.

According to yet another aspect of the present invention there is provided a communication system, including:
a. a first application program operating on or in connection with a first communication node;
b. a plurality of geographically distributed gateway nodes;
c. a second application program providing data for communication to the first communication node for processing by the first application program; and
d. a central host for selecting one or more of the gateway nodes for communicating the data to the first communication node for processing by the first application program.

Another aspect of the present invention provides a method of communication, including:
a. a user node receiving data from a remote application program, the data including message data for communication to a central application program operatively associated with the remote application program;
b. one or more access nodes receiving the message data from the user node via a first communications interface, and communicating the message data via a second communications interface to one or more of a plurality of geographically distributed gateway nodes; and
c. a hub communicating with one or more of the plurality of geographically distributed gateway nodes to receive the message data for communication to the central application program.

Another aspect of the present invention provides a method of communication, including:
a. operating a first application program on or in connection with a first communication node;
b. providing a plurality of geographically distributed gateway nodes;
c. operating a second application program providing data for communication to the first communication node for processing by the first application program; and

COMMUNICATION SYSTEM AND METHOD

CROSS-REFERENCE TO RELATED APPLICATIONS

This application is a Continuation Application of U.S. patent application Ser. No. 15/877,246, filed Jan. 22, 2018, which is a Continuation Application of U.S. patent application Ser. No. 14/430,096, filed Mar. 20, 2015, which is a National Stage Application of International Patent Application No. PCT/AU2013/001078, filed Sep. 20, 2013, which claims the benefit of, and priority to, Australian Patent Application No. 2012904130, filed Sep. 21, 2012, the contents of these applications being incorporated entirely herein by reference.

TECHNICAL FIELD

The present invention relates to a communication system and method. In a typical application, an embodiment of the present invention may provide services for supporting data communication between remotely deployed equipment and a control and management system via a satellite based access node.

BACKGROUND

Providing two-way data communications to remote sensors and devices is becoming increasingly critical for a wide range of applications. Cost effective communications to terrestrial and maritime field sensors, and industrial automation and control equipment, for example, has the potential to deliver significant economic and environmental benefits in areas such as environmental monitoring for climate change, water, mining, agriculture, defence and national security.

Many high-value applications have modest data rate requirements (kilobits per second), and can tolerate intermittent communications with latency up to several hours. Frequently such applications involve sensors in very remote areas where terrestrial communication solutions do not exist, are unreliable, are denied or insecure (for example, in a defence context). These constraints often mandate the use of satellite communications. For example, for long range oceanic environmental monitoring for environmental, economic and national security reasons, satellite communications is the only feasible solution for command, control and extraction of sensor data. Often, this information will be sensitive (for economic or national security reasons), and so a secure communication system is required.

Unfortunately, existing commercial satellite services may be designed for other applications. For example, at one end of the scale there are expensive, real-time, broadband services. At the other end, there is one-way communications for very small amounts of data.

Prohibitive cost and technical constraints have limited widespread use of large numbers of remote field sensors. Accordingly, it appears that remote communications are commonly under-utilised, or cumbersome data collection is employed, for example, infrequent manual retrieval through site visits, diminishing the ability to collect critical data.

There is thus a need to provide a communications system and method which provides improved communication services for remotely deployed equipment.

SUMMARY

According to a first aspect of the present invention, there is provided a communication system, including:
a. a user node for receiving data from a remote application program, the data including message data for communication to a central application program operatively d. providing a central host for selecting one or more of the gateway nodes for communicating the data to the first communication node for processing by the first application program.

Preferably, at least one of the access nodes includes a satellite based node.

Preferably, the gateway nodes and/or the user node are low power nodes. In an embodiment, the low power nodes have an EIRP of less than 5 W.

Embodiments of the present invention may provide either one way (ground-to-satellite) or two-way (ground-to-satellite and satellite-to-ground) communications.

It is envisaged that providing a geographically distributed set of gateway nodes may increase the duration of connectivity between gateways and satellite payloads, and thus reduce data transfer latency.

Embodiments of the present invention are expected to provide advantages in various applications requiring satellite based communications systems. By way of examples, such applications may include long range oceanic environmental monitoring, unattended ground sensors, and monitoring and control of remote assets for the mining industry.

BRIEF DESCRIPTION OF DRAWINGS

A preferred embodiment of the present invention will be discussed with reference to the accompanying drawings wherein.

In the following description, like reference characters designate like or corresponding parts throughout the figures.

DESCRIPTION OF EMBODIMENTS

An embodiment of the present invention will now be described in terms of a satellite communication system which provides services which allow message store and forward between remotely deployed equipment and a centralised control and management system of an end user via a satellite based access node. In general terms, the types of services provided by the system may include communication services, system services and user services.

In terms of communication services, in the present example, two types of communication services may be provided by an embodiment of the communication system, namely, Service Type 1 (hereinafter "ST1") and Service Type 2 (hereinafter "ST2"). Service Type 1 (ST1) is a 1-way service, catering to terminals with small transmission size requirements, whereas Service Type 2 (ST2) is a 2-way service, catering to terminals with larger data transfer requirements. Both the ST1 and ST2 service types may be provided within a common message store-and-forward network framework.

Figure 1:
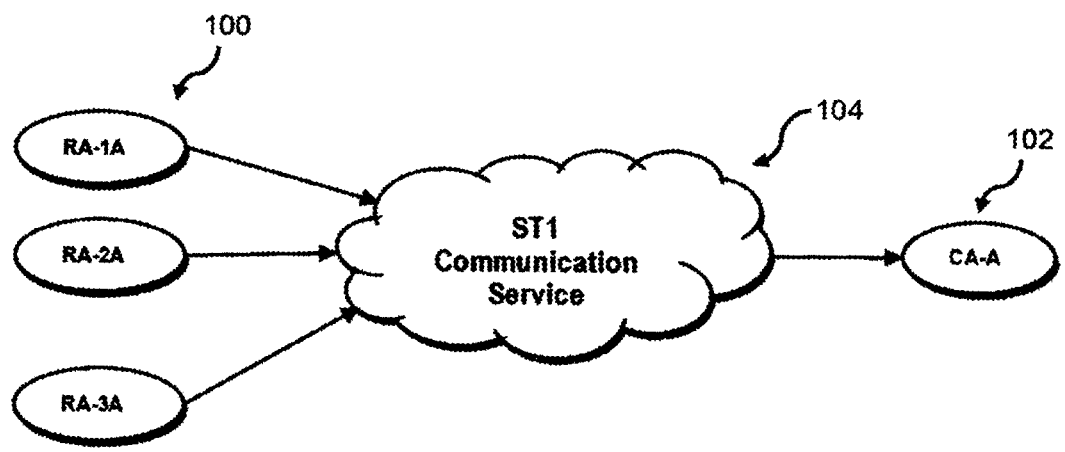
FIG. 1 is a data flow diagram showing a unidirectional message transfer from one or more remote application programs to a single central application.
Figure 2:
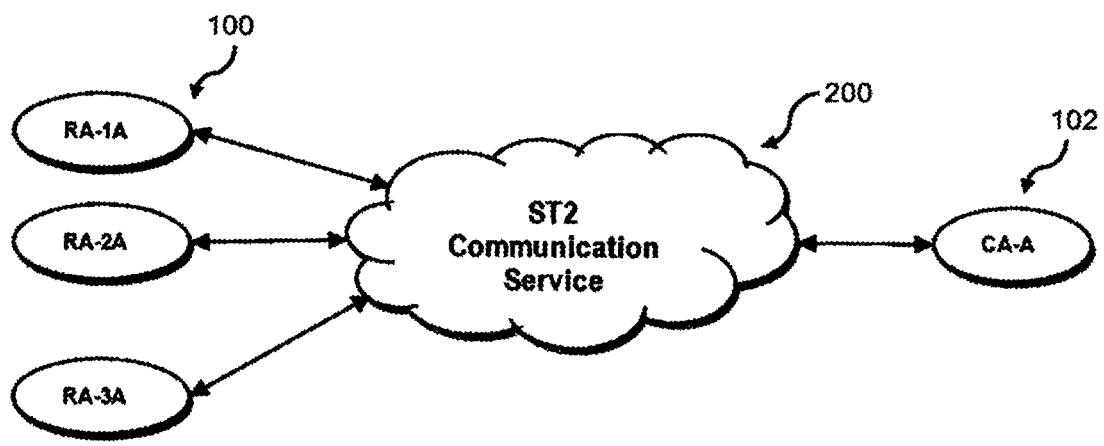
FIG. 2 is a data flow diagram showing a bidirectional message transfer between one or more remote application programs and a single central application program.

The service types provided by embodiments of the system may cater for unidirectional (that is, one way) communication or bidirectional (that is, two-way) communication respectively. In this respect, the described embodiment of the present invention relates to an integrated communication service offering both service types. However, it is to be appreciated that it is not essential that all embodiments of the present invention offer both communication service types. In this respect, FIG. 1 shows an example of a unidirectional message transfer from one or more remote application programs 100 (shown as RA-1A, RA-2A, and RA-3A) to a single central application program 102 (shown as CA-A) using a unidirectional service 104 (shown as ST-1). On the other hand, FIG. 2 shows an example of a bidirectional message transfer between one or more remote application programs 100 (shown as RA-1A, RA-2A, and RA-3A) and a single central application program 102 (shown here as CA-A) using a bi-directional service 200 (shown as ST-2).

Figure 3:
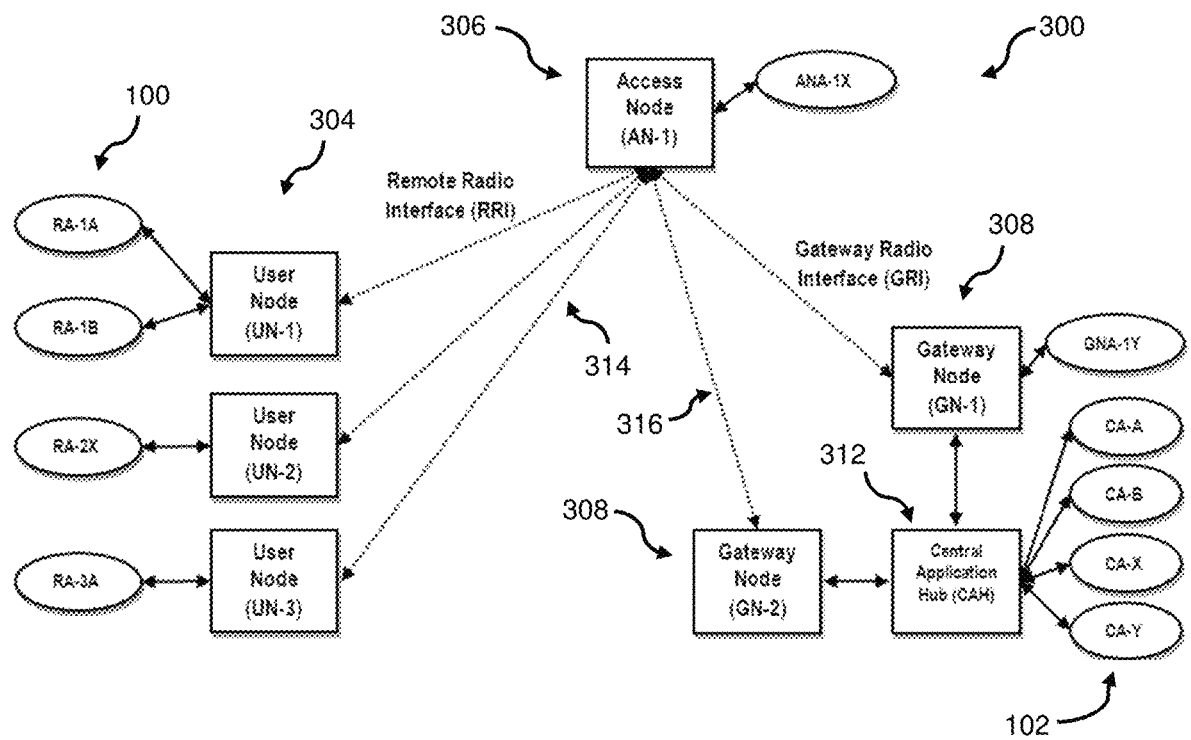
FIG. 3 is a system block diagram for a communication system according to an embodiment of the present invention.

FIG. 3 shows a block diagram for a communication system 300 in accordance with an embodiment of the present invention. As shown, the system 300 includes plural remote application programs 100 (shown as RA-1A, RA-1B, RA-2X, and RA-3A), plural user nodes 304 (shown as UN-1, UN-2, UN-3), an access node 306 (shown as AN-1), geographically distributed gateway nodes 308 (shown as GN-1, GN-2), central application programs 102 (shown as CA-A, CA-B, CA-X, CA-Y), access node application program (shown as ANA-1X), and a central application hub 312 (shown as CAH). It will of course be appreciated that the number of remote application programs 100, central application programs 102, access nodes 306, user nodes 304, and gateway nodes 308 included in the illustrated embodiment is not intended to limit the scope of the invention. Accordingly, other embodiments of the present invention may include a different number of remote application programs 100, central application programs 102, user nodes 304, access nodes 306, gateway nodes 308, and potentially central application hubs.

In the present case, each node is an individually addressable functional network entity that provides radio communication services within the system 300. Each user node 304 provides communication services to one or more of the remote application programs RA-1A, RA-1B, RA-2X, and RA-3A which allows the remote application programs to communicate with an associated central application program CA-A, CA-B, CA-X, CA-A via the communications system 300. Two logical communication interfaces are also shown, namely the remote radio interface 314 (RRI), and the gateway radio interface 316 (GRI). The nodes and the communication interfaces will be described in more detail later.

In the present case, each of the functional network entities has access to a common timing reference (not shown), such as a common timing reference provided by a Global Positioning System (GPS). All transmissions in the system 300 are time-synchronised to this reference. For convenience we shall use the term "GPS" to denote the common timing reference. However it will be appreciated that other time (and position) determination systems may be used.

The remote application programs 100 may be installed on a user device (not shown) equipped with suitable processing and communications infrastructure, such as a user terminal (UT) or another device which is connected to a suitable user terminal via a communications interface. The user or other device will typically be located in geographic locations which are remote from its associated central application program and thus may be located in a region not readily accessible to a user.

The remote application program 100 may include, for example, an environmental monitoring remote application program for collecting, processing and transmitting environmental monitoring data (such as temperature, audio, video, and/or other sensor data) from one or more sensors; an asset monitoring remote application program for collecting, processing and transmitting of system monitoring data, such as from mining equipment, water infrastructure, energy infrastructure, transport assets and infrastructure; a remote application program for processing and/or forwarding of data within a SCADA system; a remote application program for monitoring and controlling local equipment in response to operational commands issued by a corresponding central application; a remote application program for object position reporting, enabling object tracking and monitoring services (objects may be land, air or sea based, and could be mobile or stationary); or a remote application program for delivering system services applications such as file transfer, firmware upgrade (user terminal and/or application), and node monitoring and management.

In the present case, each of the plural remote application programs 100 are operatively associated with a respective one or more of the central application programs 102. In the system 300 illustrated in FIG. 3, the remote application programs RA-1A, RA-1B are operatively associated with central application programs CA-A and CA-B respectively, whereas remote application programs RA-2X, and RA-3A are associated with central application programs CA-X and CA-A respectively. In this respect, throughout this specification references to "operatively associated", where used to describe a relationship between a remote application program and a central application program, are to be understood to denote a relationship in which the remote application program and the central application program are elements of a distributed application, and thus have a functional interdependency. In other words, the remote application program and the central application operate in combination to deliver or provide a service.

In embodiments of the present invention, a distributed application may be formed through distribution of application programs (that is, software) running on multiple nodes of the system 300. In this respect, the term "software," as used herein, includes but is not limited to one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skilled in the art that the form of software is dependent on, for example, requirements of a desired application, the environment it runs on, and/or the desires of a designer/programmer or the like.

Furthermore, those of skill in the art would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps will be described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Preferably, distributed elements (that is, the application programs) of the distributed application can thus run in connection with any one of any node(s) of the system 300. In this way, for example, an application program operatively associated with a central application program may interoperate to permit, for example, an increased level of access to services, node system function access, firmware upgrade and remote management. Interoperation of this type may also support collation and/or processing of message data, decision making, and possibly provide a reduced load on communications interfaces.

In the example that follows, application programs will be described in terms of the remote application programs 100 and the central application program(s) 102. However, it is to be appreciated that other application programs may also be provided, such as, access node applications and gateway node applications, each of which may also be operatively associated with a central application program 102.

Each of the central application programs 102 may include an application program in the form of computer executable software installed on a user device such as a host computer accessible to a user and equipped with suitable processing and communications infrastructure. Suitable host computers may include a tablet, a desktop computer, a smart phone, a laptop computer, a notebook computer or the like.

One or more of the central application programs 102 may provide one or more functions for controlling, managing, monitoring, configuring, or updating the associated remote application program. Examples of central application programs include an environmental monitoring central application program for collating and/or processing sensor data from one or more remote application programs and potentially combining geographic and sensor data to produce measures of distributed natural processes; an asset monitoring and tracking central application program for processing position and sensor data from user assets and potentially providing historical, current and potentially estimated future location information; a central application program for monitoring the state of remote plant, and potentially processing state data to make decisions about future plant operations; a central application program for distributing firmware upgrade data and commands to one or more remote nodes (which may include system and/or remote application program firmware); a central application program for transmitting and receiving files to/from other nodes within the communication system 300.

In some embodiments, a central application program permits remote management and control of the associated remote application program. Such a central application program may also send commands to a monitoring and control remote application in order to control, for example, plant operation, and/or the collection of monitoring data to, for example, control and monitoring of a fleet of autonomous vehicles.

To access the services of the system 300, each of the central application programs 102 is preferably required to register with the central application hub 312 (hereinafter the "hub") by a suitable registration process. Registration of each of the central application programs 102 with the hub 312 may be performed, for example, across a network for example, via an Internet Protocol based mechanism. Similarly, each of the remote application programs 100 are preferably required to register with a respective one of the user nodes 304 via a suitable registration process using a suitable application interface such as an application interface protocol operating over IP services (for example, TCP), or a software API employing software function calls.

Once registered, a remote application may transmit messages to its associated central application program via the user node with which it has registered.

In the embodiment illustrated in FIG. 3, one or more of the user nodes 304 may provide a message storage function (MSF) which:
  Stores partial messages received from the access node 306, until all message fragments are received. When a message is fully received, it is delivered to a destination remote application program; and
  Stores messages from a remote application RA-1A, RA-2A, RA-2X, and RA-3A connected to a user node UN-1, UN-2, UN-3 until the access node 306 becomes available to allow outgoing messages to be transmitted.

One or more of the user nodes 304 may also provide system management services, such as:
  A firmware upgrade mechanism to allow all aspects of the node software/firmware to be reliably upgraded; and
  Node management services.

In some embodiments, the user nodes 304 may compress data prior to transmission to reduce load on the communications interfaces 314, 316.

Gateway Nodes

In the embodiment depicted in FIG. 3, each of the plurality of gateway nodes 308 are geographically distributed over an area and provide communication services to the hub 312 and the access node 306 for communicating messages to/from the central application programs 102. Each gateway node GN-1, GN-2 also provides the gateway radio interface 316 and an application interface as described below.

The gateway nodes 308 also provide a connection to the hub 312, the availability of which may be:

Persistent: for example, via a permanent Internet connection; or
  Intermittent—for example, via a wireless network connection that becomes active when a mobile Gateway Node moves into range of the network.

Each of the plurality of gateway nodes 308 may provide a message storage function (MSF) at the gateway which:
  Routes messages between the hub 312 and the one or more access nodes in the system 300.
  Stores partial messages received from the access node 306, until all message fragments are received. Messages (or received message fragments in the case of a broken connection) are delivered to the hub 312 for delivery to its destination central application program CA-A, CA-B, CA-X, CA-Y. In the case of a broken connection, remaining fragments at the access node 306 may be delivered to a different gateway node for message re-construction at the hub 312. If a connection to the hub 312 is not available, the message is stored until a connection becomes available.
  Stores messages destined for a remote application RA-1A, RA-1B, RA-2X, RA-3A received from the hub 312 until the access node 306 becomes available to allow outgoing messages to be transmitted.
  Stores messages received from local gateway node applications (via an application interface) until a connection to the destination becomes available, for example, via the access node 306 or hub 312 connection.

Each gateway node GN-1, GN-2 may also provide system services, such as:
  A firmware upgrade mechanism to allow all aspects of software/firmware installed on the gateway node to be reliably upgraded; and
  Node management services described below.

In some embodiments, one or more of the gateway nodes 308 may be instantiated as a special type of user node, which is given priority access to the radio interface. Furthermore, one or more of the gateway nodes 308 may compress data prior to transmission to reduce load on the radio interface.

One or more of the gateway node 308 may be located on the surface of the earth, be airborne, or space-based.

Access Nodes

The access node 306 may include a space-based, airborne, or terrestrial entity providing:
  1 and/or 2-way communication with remote terminals via the remote radio interface 314;
  1 and/or 2-way communication with gateway terminals via the gateway radio interface 316; and
  An application interface.

In the embodiment illustrated in FIG. 3, the access node 306 communicates message data intended for communication to one or more of the central applications programs 102 via a selected one of the gateway nodes 308 and the hub 312. However, it is also possible that the access node 306 may communicate directly with the hub 312. The access node 306 to hub 312 connection may be:
  Persistent—for example, via a permanent Internet connection; or
  Intermittent—for example, via a wireless network connection that becomes active when a mobile Access Node moves into range of the network.

Preferably, the access node 306 also provides a message storage function (MSF) which:
  Stores messages received from user nodes 304 for communication to one or more of the central application programs 102 from one or more remote applications 100 connected to a respective user node UN-1, UN-2, or UN-3;

Stores messages received from one of the plurality of gateway nodes 308 for communication to one or more of the user nodes 304; and Stores messages received from local access node applications (shown as ANA-1X) until a connection to the destination becomes available, for example, via a gateway node 308 or hub 312 connection.

The access node 306 may also provide system management services, such as:

A firmware upgrade mechanism to allow all aspects of software/firmware installed on the access node 306 to be reliably upgraded; and Node management services described below.

The access node 306 may also provide one or more of the following services:

Real-time message forwarding between the central applications programs 102 and their respective associated remote application program RA-1A, RA-1B, RA-2X, or RA-3A when the access node 306 has simultaneous connections to one or more of the user nodes 304 and to the hub 312 (either directly or via the system, for example, through one of the plurality of gateway nodes 308).

Real-time message forwarding between remote application programs 100 that are connected to a respective one of the user nodes 304 when the access node 306 has a simultaneous connection to the respective user node UN-1 or UN-2.

Preferably, the access node 306 controls network access rights for the system entities, such as the user nodes 304 and the gateway nodes 308. Control of this type may be applied to attributes such as:

Maximum data transfer size; and

Priority of message delivery.

In this respect, rights may be controlled taking into account system attributes, such as:

An identifier assigned to the user and/or gateway nodes or a group of user nodes and/or gateway nodes;

The geographic location of the user and/or gateway nodes; and

Current time.

The access node 306 may receive centralised network access control instructions setting the network access rights from the hub 312. It is possible that the access node 306 may compress data prior to transmission, thus reducing load on the communications interfaces 316 (GRI) and/or 314 (RRI).

The gateway radio interface 316 may be implemented as a 1-way communication from the access node 306 to the plurality of gateway nodes 308. In such an implementation, the access node 306 may use a rateless coding scheme (for example, Fountain codes or Raptor codes) to transmit coded packets to the plurality of gateway nodes 308. The gateway nodes 308 will then forward the received packets to the hub 312 where they will be decoded.

Service Type 1 Recorder Node (ST1RN)

Embodiments of the present invention may include an ST1 Recorder Node (ST1RN) which provides the following for Service Type-1:

Support for embodiments in which the ST1 receiver signal processing is performed on samples recorded by the node, potentially at a location away from the node;

Reception and recording of ST1 signals from the remote radio interface 314;

1 and/or 2-way communication with gateway terminals via the gateway radio interface 316. Recorded channel data may be forwarded over the gateway radio interface 316 for signal processing away from the node, for example, from a satellite to a central ground station, or from a terrestrial node to a central processing location; and Time and (potentially node position) stamping of recorded samples.

The ST1RN may also provide an application interface for access to system management services, such as:

A firmware upgrade mechanism to allow aspects of the node software/firmware to be reliably upgraded; and Node management services described below.

The ST1RN may compress recorded channel data prior to transmission, thus reducing load on the communications interface. The ST1RN may include a space-based, airborne, or terrestrial entity Central Application Hub (CAH)

The central application hub 312 provides communication services for the central applications programs 102. The hub 312 allows the central application programs 102 to register, and provides an application interface by which the central application programs 102 may communicate with their associated remote application RA-1A, RA-1B, RA-2X, or RA-3A. In this respect, in the system 300 illustrated in FIG. 3:

CA-A is associated with to RA-1A, RA-3A (for example, position tracking service);

CA-B is associated with RA-1B (for example, sensor network service);

CA-X is associated with ANA-1X and RA-2X. In this distributed case it may be that a service has CA-X communicating with ANA-1X and RA-2X individually, for example, a system service that gathers node statistics. Alternatively it may be that CA-X communicates with ANA-1X (for example, to upload a file) and then later ANA-1X communicates with RX-2X to allow it to download that file, for example, in a file transfer service; and CA-Y is associated with GNA-1Y (for example, system service for gateway management).

The hub 312 may route messages to/from the access node 306 either directly, or via one or more of the plurality of gateway nodes 308.

As shown in FIG. 3, in an embodiment an interface is provided between the central application programs 102 and the hub 312. This interface may be provided using the Internet Protocol (IP). The interface may provide the following functions:

Application registration mechanism, which allows for central applications to register for messaging services; and Message a transportation mechanism (for example, via IP, UDP or TCP).

The hub 312 may also provide the message storage function (MSF) which performs:

Node routing; and

Central application routing.

Further explanation of the message storing function of the hub 312 is set out below.

Node Routing

In an embodiment, the hub 312 may perform node routing of message data depending on the availability for communication of the access node 306 or the plurality of gateway nodes 308. For example, if the hub 312 has an active direct connection to the access node 306 (in other words, a connection which does not require a gateway node 308, the hub 312 may route messages directly to the access node 306. Alternatively, the hub 312 may route messages for communication to the access node 306, or for communication to a user node UN-1, UN-2, UN-3, through the access node 306, via one of the plurality of gateway nodes GN-1, GN-2.

In some embodiments, the hub 312 may receive reports of partial transmission from a gateway node GN-1, GN-2 or the access node 306. Based on a received report, the hub 312 may then re-allocate the transmission of remaining message fragments which may potentially involve a different gateway node or access node.

Central Application Routing

The hub 312 may perform node routing of message data which involves routing all messages from user nodes 304 to an addressed central application program 102. In the event that an addressed central application program 102 is not available for communication with the hub 312, the hub 312 may store messages for communication to that central application program at a later time.

It is preferable that the hub 312 selects a message route which reduces message delivery latency. For example, when routing a message to the access node 306 via one of the plurality of gateway nodes 308, the hub 312 may use (expected or actual) geographic information relating to the gateway nodes GN-1, GN-2 and/or access nodes in order to select the gateway node GN-1, GN-2 that is expected to be within range of the access node 306 in the nearest time. It is possible that a similar approach may be used to geographically route messages to user nodes 304 via a selected access node.

For the purposes of geographic routing and broadcast or multicast message transmission, geographic "transmission regions" may be defined so that transmission regions may be specified for individual messages. Methods for defining such transmission regions may include:

Boundaries specified in terms of latitude and longitude limits, for example, defining regions using an upper and lower corner boundary specification;

Using international country codes, allowing specification by country rather than geographic boundaries; and Pre-defining a list of regions with a region index being assigned to each region.

In some embodiments; the hub 312 may select a transmission region to balance load across the system 300, for example, avoiding routes through a heavily loaded gateway node when an alternate route is available.

It is preferred that the hub 312 maintains connectivity with gateway nodes 308, and provides centralised control and monitoring of each of the plurality of gateway nodes 308.

In some embodiments, the hub 312 also provides system services, such as:

Distribution of firmware/software upgrades to nodes within the system 300; and

Centralised server component of the remote management service described below.

It is notable that although the embodiment illustrated in FIG. 3 includes a single hub 312, it is possible that the other embodiments of the system 300 will provide multiple central application program connection points through multiple hubs. In such embodiments, each of the plurality of gateway nodes 308 may be tasked to route to a different hub 312 based on identification of the central application. In one embodiment, one or more central application hubs may be dedicated to system services. In another embodiment one or more central application hubs may be limited such that they can only provide access to user services.

Node Management

As briefly explained above, each node (that is, each user node, access node and gateway node) of the system 300 may provide node management functions which are adapted to provide a common and consistent interface to each of the subsystems operating on a node, and which may provide mechanisms to:

Obtain information about the state of node subsystems, for example, event counters and flags;

Provide configuration data to node subsystems; and

Provide control of node subsystems.

In some embodiments, remote access to node management may be provided via a remote management service described later.

Time and Positioning Services

In the embodiment of the system 300 depicted in FIG. 3, the user nodes 304, access node 306, and the plurality of gateway nodes 308 have access to a common timing reference through an input interface for timing synchronisation.

It is also possible that the user nodes 304, access node 306, and the plurality gateway nodes 308 also have access to a source of position information which provides position information to node functions.

The timing reference and position information services may also be provided externally to applications registered with the node.

Entity Interfaces

As shown in FIG. 3, the system 300 provides interfaces for providing and/or managing the communication of the message data across the system. These interfaces include:

Radio interfaces 314, 316; and

Application interface (not shown).

The role of the radio interfaces 314, 316 and the application interface is described below.

Radio Interface

The radio interfaces 314 (RRI), 316 (GRI) provide a shared physical communications medium which may be partitioned into a number of channels. These channels may be time slots in a time division multiple access system, frequency slots in a frequency division multiple access system, subcarriers in an orthogonal frequency division multiple access system, or spreading sequences in a code division multiple access system. More generally, the slots may be hybrids of any of these, where a slot corresponds to some subset of the overall degrees of freedom of the system (including degrees of freedom resulting from the use of multiple transmit and or receive antennas). Regardless of the underlying method of dividing the medium into channels, we shall refer to these channels as "slots". We do not require that the slots be orthogonal, although in many instances slots are chosen to be orthogonal.

For the purpose of this description, a grouping of a whole number of slots shall be referred to as a "frame". In the present case, frame dimensioning in the system 300 is determined by the access node 306. The access node 306 preferably also controls the ratio of slots allocated to access node transmit and receive directions within each frame.

Timing is synchronised throughout the system 300 via the common timing reference described previously.

The radio interfaces 314 (RRI), 316 (GRI) may employ multiple radio channels, providing increased bandwidth to service gateway and user nodes. The ability to add further channels (and potentially do so post-deployment) provides a scalable radio interface. The system 300 may thus adapt its use of channels during operation, for example, to provide a dedicated set of channels for gateway communication, or to cater for different channel allocations on a regional basis.

As explained previously, the Service Type-2 (ST2) radio interface provides a bi-directional remote radio interface (RRI) between the access node 306 and the user nodes 304. It may also be used, to provide a bi-directional gateway radio interface 316 (GRI) between the access node 306 and one or more of the plurality of gateway nodes 308. Reception of data from a user node UN-1, UN-2, or UN-3 or a gateway node GN-1 or GN-2 may be acknowledged by the access node 306, and vice versa.

ST2 medium access arbitration is preferably coordinated by the access node 306. During this process the access node 306 preferably performs the following functions:
1. Allocates transmission slots within frames to user nodes, gateway nodes and access node based on:
   Requests for access from user nodes and gateway nodes;
   Messages stored in the access node message storage function; and
   The detected presence of user nodes and gateway nodes within the current access node range.
2. Allocates packets for transmission to access node transmission slots; and
3. Regularly transmits announcement messages, announcing the presence of access node and ST2 communication services.

During ST2 medium access arbitration a user node or gateway node preferably performs the following:
1. Listens for access node announcement messages;
2. Announces its presence to new access nodes, and requests access to ST2 channel resources if it has data to transmit; and
3. Notifies higher layer services when the channel state changes (active/inactive).

The access node announcement may also include the position of the access node. The user node or gateway node may use this information to improve radio link quality, for example, by steering a directional antenna toward the access node.

The remote radio interface 314 (RRI) and the gateway radio interface 316 (GRI) will now be described in more detail.

Remote Radio Interface (RRI)

In the embodiment illustrated in FIG. 3, the remote radio interface 314 (RRI) provides a primary communications interface between the remotely located user nodes 304 and the access node 306. The remote radio interface 314 (RRI) may provide multiple different radio interfaces (Physical and Link Layer) to handle differing types of user applications.

As previously described, the Service Type-1 (ST1) radio interface is a unidirectional interface providing message transfer in the direction from user node 304 to access node 306 only. It is notable that the ST1 radio interface may also include a transfer mechanism in the access node to user node direction that is available for purposes other than message transfer.

Reception of data from a user node 304 may be acknowledged by the access node 306 using a suitable acknowledgement process.

Transmissions from the access node 306 may also be used by the user node(s) 304 for one or more of the following:
detecting the presence of the access node 306;
aligning user node(s) 304 transmissions in time and/or frequency, using the access node 306 as a reference; and
coordinating user node(s) 304 slot access.

The case when the ST1 radio interface operates without an access node 306 to user node 304, a feedback channel allows for transmit-only implementation of the user node. In the absence of a feedback channel, slot access may be coordinated.

ST1 user nodes may use position and knowledge of time of day, together with pre-programmed knowledge of access node behaviour (for example, orbit parameters in the case of a satellite system) to decide when to transmit. Furthermore, repeated transmission by a ST1 user node may be used to implement a degree of priority or Quality of Service (QoS), where repeat rate may be changed in order to change priority.

Turning now to the Service Type-2 (ST2) radio interface, the ST2 interface provides a bi-directional remote radio interface between the access node 306 and the user nodes 304, as described above.

User services will either use the ST1 or ST2 based services, depending upon the user application requirements. Application access to both ST1 and ST2 services may be provided by a common messaging interface.

Gateway Radio Interface (GRI)

In embodiments, the gateway radio interface 316 (GRI) provides a unidirectional or bi-directional communication link between the access node 306 and a gateway node 308 over which:
Messages from user nodes 304 (or from access node applications ANA-1X) may be transferred to the hub 312; and
Messages from the hub 312 may be transferred to the access node 306, to an access node application, or for communication to a user node UN-1, UN-2.

The specification and implementation of the gateway radio interface 316 (GRI) may be based upon the data throughput requirements of the system 300.

The gateway radio interface 316 may be implemented using the bi-directional Service Type-2 (ST2) radio interface described above, or in the case of a satellite mounted access node, via an existing TT&C link to the spacecraft or the Consultative Committee for Space Data Systems (CCSDS) File Delivery Protocol, or via some other suitable communications mechanism which provides sufficient resources to transport data between the gateway node and the access node, for example, a C-band or S-band link.

Application Interface

The application interface provides the applications programs with a point of access to communications and system management services provided by the system 300.

In embodiments, the application interface provides a mechanism by which the remote and central application programs, and possibly access node application programs and/or gateway node application programs if provided, register with the communications system 300, in order to use services. Registration informs functional entities that the application is present and may therefore accept delivery of messages. The application interface may also provide a mechanism through which the messages may be transported to/from the applications.

Examples of the application of an application interface include:
Remote applications 100 may use the application interface provided by their respective user nodes 304 hosting or in communication with the remote application;
Access node applications (for example, ANA-1X) may use the application interface provided by the respective access node (for example, AN-1) hosting or in communication with the access node application;

Gateway node applications may use the application interface provided by the gateway node hosting or in communication with the gateway node applications; and Central applications may use the application interface provided by the hub 312.

In addition to the functionality provided for user services, system services may be given access to system functions such as those provided for node management.

Application Programs

Application programs may be either system level or user application programs which utilise the system or user services. Such system or user services may utilise the communication system services. In some embodiments, an application program may be implemented on the same device as the functional network entity, or on a different physical device to which it has a connection. This connection may be provided via some network, such as a wired or wireless local area connection, or via the internet. It is preferred that application programs be controlled and/or re-programmed via the communications system 300.

Remote Application Programs (RA)

Each remote application program registers with a respective user node 304, and may communicate with its associated central application program 102 via the communication services of the user node UN-1, UN-2, or UN-3 with which it has registered. Once so registered, the remote application 100 accesses services provided by the user node UN-1, UN-2, or UN-3, via user node's application interface.

By way of an example, a remote application may include a remote sensing application that performs the following functions:

Measures environmental parameters, for example, temperature, and sends this information along with the user node position and time, to its corresponding central application; and Receives control information from its corresponding central application, for example, to change the time of day at which measurements are recorded.

Note that the first function, that is, the measurement of environmental parameters, may be provided via the ST1 and ST2 services. On the other hand, the second function, that is, receiving control information, requires message delivery from central application to the remote application and thus the bidirectional ST2 service.

Central Application Programs

Each central application program 102 may communicate with one or more of the remote application programs 100, the access node 306, or one or more of the plurality of gateway nodes 308 by sending and receiving messages via the hub 312 using services provided by the hub 312 via its application interface.

In terms of an example central application program corresponding to the example remote sensing remote application program described above, the central application program may:

Collate and process messages received from the remote application and then deliver a summary to users;

Allow end users to send commands to control the operation of the remote application.

Access and Gateway Node Application Programs

In some embodiments, access node application programs (for example, ANA-1X) and gateway node application programs (for example, GNA-1Y) are provided. These application programs may offer the potential for provision of additional services beyond message store-and-forward, by allowing on-board data processing and decision making at these gateway and access nodes respectively. These application programs may access services via the respective application interface.

An access node application program may provide a file transfer service that:

Allows a file to be received from the hub 312 and stored at the access node 306, potentially across several time separated connections;

Manages the distribution of the file to one user node UN-1, UN-2, or UN-3 (via unicast) or several user nodes (via multicast or broadcast); and Deletes the file at the access node upon receiving verification from the recipient user node that the file was received intact.

System Application Programs

The concept of central and remote application programs also extends to the operation of the system 300. For example, some higher-level services provided by the system 300 may be provided by system application programs which operate on the nodes of the system. These system services may include, for example:

Firmware upgrade service (FWUS); and

Remote management service (RMS).

In some circumstances, a system application program may be given priority over user applications when accessing the communications system 300. Further explanation of the firmware upgrade service and the remote management service is set out below.

Firmware Upgrade Service

The Firmware Upgrade Service may provide a mechanism by which firmware operating on system nodes (304, 306, 308) or devices connected to these nodes may be upgraded in the field via the service. The service may provide a mechanism for:

Transmitting firmware upgrade data to target node(s), either using broadcast, multicast or unicast transmissions;

Coordinated control and scheduling of the deployment of firmware upgrades;

A file transfer service (FTS), as described above.

The firmware upgrade service may be implemented with a central firmware upgrade server application responsible for disseminating firmware upgrade data to remote system nodes. A corresponding client application at the nodes receives firmware data and command/control data.

Remote Management Service

The remote management service may allow for the remote control and monitoring of nodes within the system 300, providing remote access to node management functionality. Is it possible that a central monitor and control server application, connected to the system 300 via the hub 312, may examine the status of system nodes, and send configuration and/or control data to system nodes. In this respect, each node may run a client application which is responsible for executing status or configuration change requests received.

Authentication and Security Services

It is preferred that the system nodes (that is, the user nodes, access nodes and gateway nodes) include an authentication and security mechanism to employ security mechanism at several levels within the system 300.

For example, embodiments of the present invention may provide an authentication mechanism to verify the identity of nodes within the system. In some embodiments, an authentication mechanism is used to ensure that, firstly, at a link level, only authorised nodes (in particular user nodes and gateway nodes) may obtain access to the remote radio interface 314 (RRI) and/or the gateway radio interface 316 and, secondly, at a service level, that the authenticity of a message can be verified (a guarantee that the message originated at the stated source node, and was not tampered within transit).

In some embodiments, an encryption mechanism may be provided to ensure privacy of communications. For example, at a link level this would provide privacy over the air-interface (that is, the RRI or GRI) between nodes, or at the service level, this would provide privacy of end-to-end message communication, between RAs and CAs.

Link Authentication Services

Link-level authentication may employ a public key authentication scheme to provide an assurance to both communicating nodes that each is trusted by the system central Certificate Authority. Signed public keys would be exchanged in the RRI and/or GRI channel access mechanism, allowing either node to generate signatures during the link communication session.

Link Encryption Services

Link-level encryption may be achieved by several means. Two options include:

Use asymmetric public/private key encryption mechanisms; and

Use a symmetric cypher with an appropriately generated session key shared via a secure mechanism between the two nodes at session establishment.

Message Authentication Services

Systems according to embodiments of the present invention may provide for authentication of messages within the system 300. Such authentication may be achieved using, for example, an algorithm which generates a Message Authentication Code, which employs either an appropriately derived shared-secret between the message-originating node and destination central application, or a set of public and private keys (asymmetric digital signature scheme).

Authentication systems often require unique nonce values to be generated. Nonce values may be generated using the system time, which is guaranteed to produce a stream of unique values. Duplicate nonces may be avoided by limiting the rate at which messages are generated, so that all messages have a unique time-stamp. Alternatively a mechanism to extend nonces for messages generated with the same time-stamp may be employed.

Messages transported using ST1 or ST2 services may use the same authentication mechanism, providing interoperability between the two services.

Key Management Services

In some embodiments, a public key signature system is used to provide a primary means of authentication within the system 300. In such a case, all nodes and central applications shall be assigned unique public and private key pairs.

A system wide trusted Certificate Authority may issue and sign keys, allowing for efficient key verification by nodes that deal with large numbers of node interactions (for example, ANs communicating with a large population of UNs), without requiring the distribution of large numbers of keys within the system.

Protocol Stack

Figure 12:
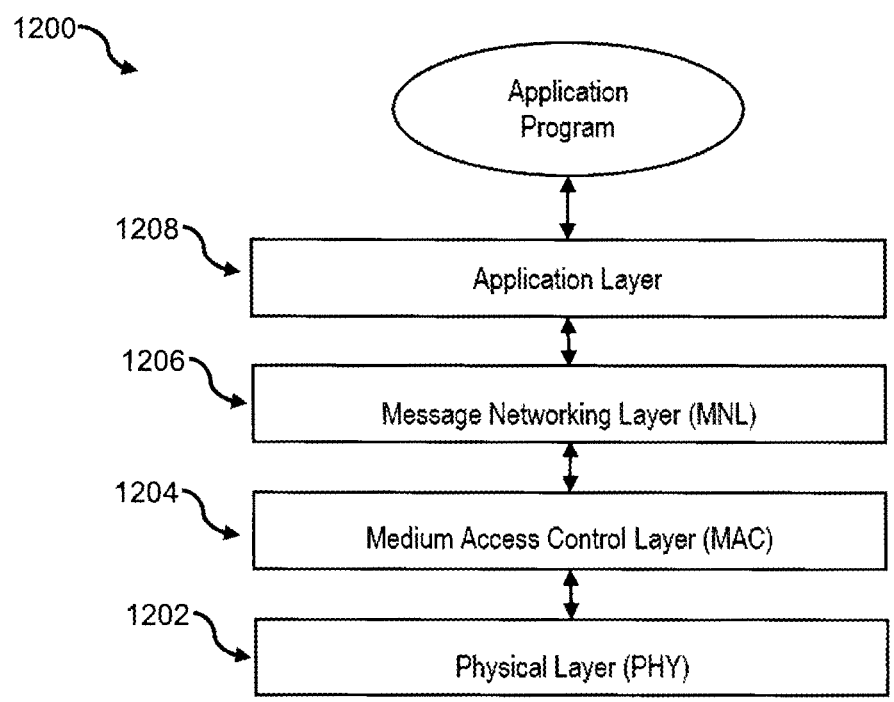
FIG. 12 is a protocol stack structure suitable for use with an embodiment of the present invention.

Turning now to FIG. 12, there is shown a protocol stack structure suitable for use with an embodiment of the present invention. As shown, in a preferred embodiment, communication system functionality is distributed across a protocol stack 1200. As is shown in in FIG. 12, the protocol stack 1200 includes plural protocol layers, namely, a Physical Layer (PHY) 1202, a Medium Access Control layer (MAC) 1204, a Message Networking Layer (MNL) 1206 and an Application Layer 1208.

The Physical layer (PHY) 1202 determines how bits are physically transmitted on a radio channel. This includes determining, for example, bit ordering, modulation, channel coding, synchronisation and detection mechanisms.

The Medium Access Control layer (MAC) 1204, also referred to as the Link Layer, determines how access to the radio channel is organised and controlled. This includes, for example, protocols for error detection and data re-transmission, session establishment and channel organisation and sharing amongst multiple users.

The Message Networking Layer (MNL) 1206 determines how data is transported between different logical entities in order to provide end-to-end communication service between remote and central applications in the system.

The Application Layer 1204 provides an application interface through which application programs may access communications and system management services.

The Physical Layer (PHY) 1202, Medium Access Control layer (MAC) 1204, Message Networking Layer (MNL) 1206 and Application Layer 1206 will now be described in more detail.

Physical Layer (PHY)

The Physical Layer (PHY) 1202 implements the physical communications link between user nodes 304 and the access node 306 (a component of the RRI), and between gateway nodes 308 and the access node 306 (a component of the GRI). This implements the ST1 and ST2 service waveforms. In the preferred embodiment all communication in the system is packet based.

PHY Elements

The PPDU (PHY Protocol Delivery Unit) is the structure of the PHY packet, as it is transmitted on the radio interface. It includes notional guard periods, synchronisation and training sequences, FEC encoding and data symbols.

The PSDU (PHY Service Delivery Unit) is the user data portion of the PPDU. This is the higher-layer protocol data that is transported within the PPDU packet. The PSDU contains the Medium Access Control Layer packet (or MPDU, Medium Access Control layer Protocol Delivery Unit).

ST1-PHY

The ST1-PHY provides a unidirectional transmission service. In an embodiment, all PPDU packets are transmitted time-synchronised to GPS time (see Medium Access Control Layer below).

In an embodiment, the ST1-PHY provides the following functions:

PSDU transmit (for user nodes);

Multi-user PSDU receiver (either implemented in the AN, or as an offline service, for example, using samples recorded by the ST1RN);

Measurement and reporting of channel parameters to upper management layers (for example, MAC Management), including:

Number of users detected; and

Per-user channel parameters such as timing offset, frequency offset, rate of change of frequency offset, and SNR.

A suitable ST1 Physical Layer is described in Australian Patent Application No 201303163, the entire contents of which are herein incorporated by this reference.

ST2-PHY

The ST2-PHY provides a 2-way communication service between user nodes/gateway nodes and access nodes. In an embodiment, two ST2-PHY signal and packet types are employed, one for the downlink signal, ST2-DN, and one for the uplink, ST2-UP. The ST2-UP uplink and the ST2-DN downlink may operate on the same channel or on different channels. The system may also operate in a time-division duplex (TDD) or frequency-division duplex (FDD) manner.

In an embodiment, all transmissions are time-synchronised with GPS time.

Access to a channel may be coordinated by the access node, and frequency-synchronised to the access node's carrier frequency. The ST2-UP and ST2-DN signalling schemes operate together in order to synchronise ST2-UP transmissions with an ST2-UP receiver, which may be located, for example, in a satellite.

Alternatively, the system nodes may use an alternate access mechanism to communicate directly in the absence of coordination from an access node. For example, user (or gateway) nodes may access a channel using methods known to those skilled in the art, such as carrier sense multiple access (CSMA), or self organising time division multiple access (SOTDMA). Such nodes may also continue to sense for the presence of an access node. Upon detecting transmissions from an access node the nodes then switch their operation such that their channel access is access node coordinated. Once the access node is no longer detected the nodes may revert to their alternate access mechanism.

The ST2-PHY may provide the following functions, for both the ST2-UP and ST2-DN signalling schemes:

PSDU transmit and receive; and

Measurement and reporting of channel parameters to upper management layers (for example, MAC Management) such as timing offset, frequency offset, rate of change of frequency offset, and SNR.

Medium Access Control Layer

In an embodiment, the Medium Access Control Layer (MAC) 1204 provides mechanisms by which access to the shared radio resource may be managed between the system nodes, and a means to transmit data between nodes within the system from user nodes/gateway nodes to access nodes, and vice-versa.

The MAC may provide the following functionality:

A common addressing scheme to uniquely identify nodes within the system;

Packet transfer services between user nodes/gate way nodes to access nodes;

Coordination of use of one or more radio channels by the system, including:
a. Frame timing reference;
b. Frame timing and access rules enforcement;
c. Time Division Multiplexing allocation and management; and
d. Multiple channel operation management.

Data Services

The MAC may provide the following data services:

ST1 unacknowledged small message service (UMS) and acknowledged small message service (AMS), as follows:
a. For small payload transmissions, for example, containing position and sensor data;
b. Transmitted using the ST1 access mechanism; and
c. Maximum size limited by the ST1-PHY PSDU transmission size.

ST2 unacknowledged message service (UMS)
a. Transmission of small to large payloads without confirmation of delivery.

ST2 acknowledged message service (AMS)
a. Transmission of small to large payloads.
b. Transmission of messages where notification of delivery is important.
c. Provides acknowledgement response to higher layer.
Protocol multiplexing, allowing multiple protocols to operate over the service.

Medium Access

The Medium Access Control scheme may include a slotted, semi-scheduled TDMA scheme. All nodes in the system are preferably time-synchronised via the GPS system.

The MAC layer may be position aware, and thus able to use user node and/or access node position data to aid resource allocation decisions, using techniques such as those described in described in International Patent Application No PCT/AU2013/000895.

In one embodiment, the system employs the following radio channel resources:

RC1 (Radio Channel 1). A radio channel which is used for ST1 burst transmissions from user nodes.
a. Uncoordinated Time and Frequency, Slotted-ALOHA with multi-user detection.

RC2 (Radio Channel 2). A radio channel which is used for ST2 communications between user nodes/gateway nodes and an access node.
a. Centrally coordinated slotted-TDMA. The radio channel is shared between the access node and user nodes/gateway nodes in a time/frequency-division multiple-access manner, under control of the access node.

Another embodiment of the system may be extended to support operation on multiple additional radio channels, subject to access nodes and user node/gateway node radio capabilities, and the regulatory environment.

In a preferred embodiment, all transmissions of ST1 and ST2 operating modes are aligned to frame and slot timing of the system. The concept of a frame is used to allow for the definition of transmission slots within the system. In a preferred embodiment:

A frame has duration which is an integral fraction of 60 seconds, and is synchronised to the UTC minute rollover (for example, 4 seconds); and Frame timing is based on slots having a duration which is a multiple of an integer number of symbol periods.

In another embodiment each PHY has a slot period which is equivalent to the duration of one fixed-length packet transmission interval, including guard periods.

ST1 Access Method

In an embodiment the ST1 access method employs an uncoordinated slotted ALOHA scheme. User terminals transmit packets of a fixed size and commence transmission on an ST1 slot boundary.

User terminals may access the channel using techniques described in International Patent Application No PCT/AU2013/000895.

In the case of satellite reception, due to propagation delay and the motion of the satellite, packets received at the access node may vary in timing offset and frequency offset. In the preferred embodiment ST1 packet transmissions will include sufficient unused guard time to allow for variation in propagation delay.

Synchronised slot times for the ST1 service allow the timing of ST1 transmissions received at the access node to be constrained. This is advantageous for the multi-user signal processing of multiple overlapping packets as it prevents overlap between slots.

ST2 ACCESS METHOD

In the preferred embodiment the ST2 Access Method employs a TDMA access scheme to coordinate access to the channel during a frame period.

The Medium Access Control function operating in the access node transmits downlink TDM slot allocation information in each frame period (for the following frame period). It also transmits uplink slot allocation information in each frame period. User nodes/gateway nodes may request, further transmit slots in packets they send to the access node.

A portion of the uplink frame period is reserved for slotted-ALOHA access to allow new UNs/GNs to request initial access to the channel. Requests may collide, resulting in lost requests. These will be re-tried by the user nodes/gateway nodes in a later frame.

In the preferred embodiment TDMA frame timing is referenced with respect to UTC time at the access node, and transmissions from user nodes/gateway nodes to the access node include pre-compensation for the effects of frequency and timing offset. In the preferred embodiment these parameters are estimated by each UN based upon reception of packets from the access node via the ST2-DN downlink.

In the preferred embodiment the access node synchronises its transmissions with UTC time only. The UN ST2-DN receiver then estimates and compensates for channel effects such as carrier frequency offset, and timing offset.

Multiple Channel Operation

In one embodiment the system supports multiple channel operation, providing a mechanism for channel frequency agility, and also the possibility for operation on multiple channels concurrently. Multi-channel operation also allows the system to be implemented in a single channel operating mode, where the same radio channel is used for both ST2-UP and ST2-DN links.

When an access node allocates transmission slots to a user node or gateway node, it also identifies the channel on which the slots have been allocated.

All channels available for operation are identified by a unique channel number; and A channel number to channel frequency map instructs user nodes which frequency is to be used for each given channel number. The map may be pre-loaded into the user nodes or announced by the access node.

Identification and Addressing

In an embodiment all logical nodes within the system are assigned a Node Unique ID (NUID) which allows them to be unambiguously identified within the system. All transmissions by devices within the system include their NUID. The NUID may also be used to identify the destination of messages in the system.

In one preferred embodiment the NUID length is 48 bits.

Link Level Authentication

In an embodiment, system authentication mechanisms prevent unauthorised access to the radio channel. Authentication within the Medium Access Control layer ensures that only those nodes with the appropriate credentials have access to communication services.

A user/gateway node authentication mechanism proves user node/gateway node eligibility for access to the access node with which they are trying to operate. In an embodiment the channel reservation system employs a strong authentication method.

In an embodiment authentication operates in both directions, so that user nodes and gateway nodes ensure they are communicating with an authorised access node before initiating data transport.

Message Networking Layer

The Message Networking Layer (MNL) 1206 provides networking and transport mechanisms for transporting user messages across multiple link layers between a source and a destination. The MNL may provide the following functionality:

A Message Transport function, providing network layer protocols for message transport, which:
  a. Provides an interface to the Application Layer.
  b. Provides an interface to the MAC, determining how the network layer protocols operate over the link layer interface (MAC).
  c. In an embodiment an acknowledged delivery service is provided, where applications are notified of successful delivery via the network layer interface. Note that these acknowledgements could be significantly delayed depending upon the remote location of the applications.

A Message Networking function, providing a store and forward mechanism:
  a. Routing (including geographic routing) and addressing
  b. Queuing and scheduling of data for transmission Message Transport Function In an embodiment of the present invention, the Message Transport function provides:
  A small message service, which maps directly to single link layer packet unacknowledged message service (UMS) and acknowledged message service (AMS).
  A large object transport service for transmitting large data objects, such as firmware upgrade, images, etc.
    a. Service uses either the AMS or UMS and provides suitable fragmentation, re-assembly and re-transmission functions.
    b. Broadcast/multicast, for example, for transmission of bulk firmware upgrade images to devices in the field.
    c. Unicast
      Transmission of large data objects from remote sensor applications to corresponding central applications connected to the CAH.
      Transmission of large data objects to a specific user node and application, for example, for single device firmware or configuration upgrade.
  Broadcast or multicast of large objects—whole or fragments of large objects will be stored on access node. In this case the central application sends an object to the CAH, and the CAH transmits it to the access node. The access node then transmits to other nodes using appropriate rules to determine when and where to transmit, for example, based on geographic routing. When transmission has completed, the object is removed.
  Geographic routing, including management of messages sent and the geographic areas in which they were sent.
  In an embodiment, data transfer sessions between the access node and user nodes/gateway nodes will include exchange of position information, allowing the access node message transport function to make informed decisions about when to schedule messages for transmission to individual or groups of nodes.

Message Networking Function

In the preferred embodiment a Message Networking function is responsible for routing and queuing messages which are in-transit through the system, including the following.

Routing of inbound messages to appropriate queues per destination, including:
  a. Messages from user nodes routed to the CAH.
  b. Messages from CAH may be routed to any node (gateway node, access node, and typically user nodes).

Queuing of messages, based on quality of service (QoS) and/or user priority status, including:
  a. User Node queues, for all messages provided by gateway nodes destined for user nodes.
  b. Gateway Node queues, for messages from user nodes destined for the CAH.
  c. Broadcast and multi-cast transmission queues
  d. Geographic broadcast queues.

Storing messages in queues until they are able to be delivered (or they expire due to age).

Delivery to local applications.

Message Level Security

In an embodiment, authentication is employed for transmitted data, allowing the integrity of received data to be verified. Authentication is provided by a sufficiently robust and reliable digital signature mechanism. Authentication of messages provided at the application-to-application interface ensures that the receiving application can trust that the transmitting application did indeed transmit the message, and that the message has not been compromised.

In another embodiment the data encryption is provided as an integrated component of the messaging service.

Application Layer

In an embodiment the Application Layer 1208 provides an application interface mechanism through which application programs can register with the communications system and then access communications and system management services.

In another embodiment the Application Layer 1208 provides an interface to third party protocol stacks (or stack components) that may reside between the communications system and the application program. In this case the application layer may implement an interface that enables system access to application programs designed to communicate via the third party protocol. Third party protocols may include, for example, industry standard protocols such as the Distributed Network Protocol (DNP3) and Modbus.

System Entities

The functional network entities described above may be implemented within the physical system entities described in this section. The entities described in this section may be implemented using fixed or reconfigurable architectures, such as software defined radios (SDR). In this respect, an SDR type implementation may allow further benefits, such as, on-board processing, which may lead to improvements for sensing, automation and control not possible with conventional systems. Further, an SDR may be remotely configured or updated, which may allow lower cost bug fixes, upgrades or optimisation. These features are expected to be particularly advantageous in implementations in which one or more system entities are remotely deployed, such as space-based systems.

Having generally described the role and operation of the system entities of an embodiment of the system, the description will now turn to the functional architecture of those entities. It is to be noted that the description that follows refers to functional views of the system entities which omit details regarding power supply. It is assumed that the entities are appropriately powered, either via mains supply and/or battery and/or solar power.

Node Based System Entities

Figure 4:
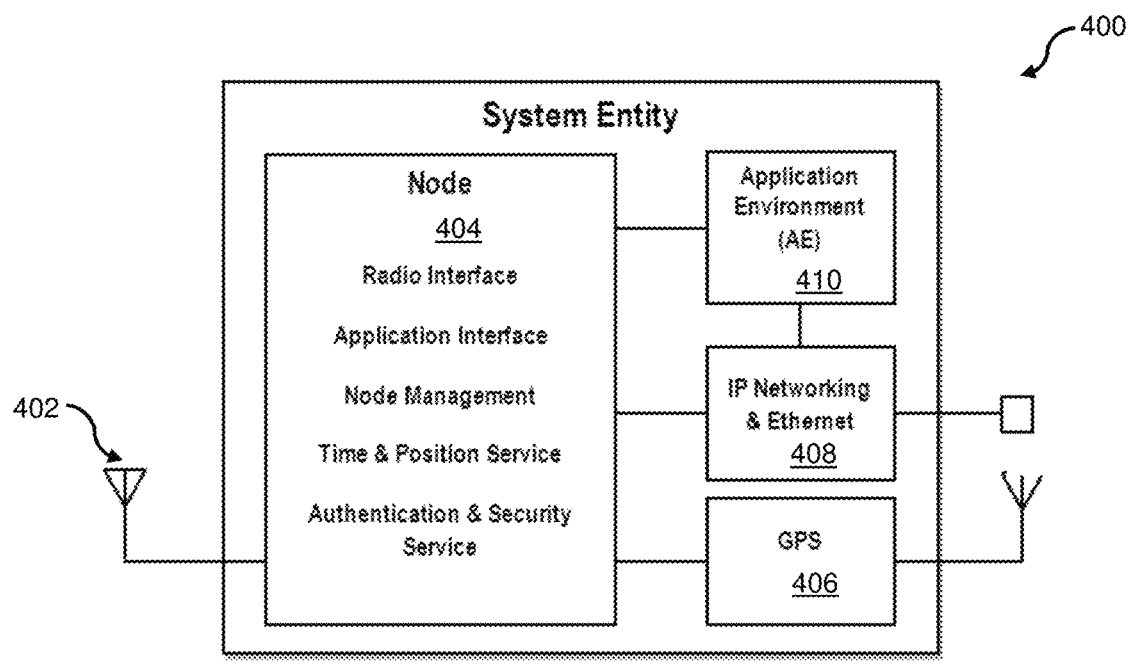
FIG. 4 is a functional block diagram for a node architecture suitable for use with a communication system in accordance with an embodiment of the present invention.

FIG. 4 is a generic functional block diagram for a node based system entity 400. In the present case, the node based system entities include:

The user node (UN), which may be implemented within user terminal (UT) equipment;

The gateway node (GN), which may be implemented within gateway terminal (GT) equipment; and The access node (AN), which may be implemented within any system entity that is selected to provide a point of access into the system 300 (ref. FIG. 3).

Examples of a system entity which may provide a point of access into the system 300 include:

Satellite payload in the case of a satellite communications system;

Cellular Base station; or

Wireless access point.

FIG. 4 depicts a node including single antenna radio interface 402. However, it is to be noted that the number of antennas and their configuration will depend upon the radio implementation, and that the architecture also supports the use of multiple antennas.

As shown in FIG. 4, the node entity 400 includes a node 404, a GPS receiver 406, providing time and position information to the node 404, a communications interface 408 (shown here as a IP/Ethernet interface), providing external connectivity to the node 404 and applications, and an application environment 410.

The application environment 410 may be used to execute system applications. It may also be configured to allow users to execute applications on the entity, rather than connecting via the communications interface 408. The environment provided to a user may be implemented in an abstract manner that separates it from core functionality of the entity thus protecting critical functions such as node operation in the event of application failure, for example, via one or more virtual machines.

The node entity 400 may also implement additional features, such as a user interface, further input/output interfaces (for example, USB, RS-232, CAN, or other satellite system bus interface), and an Ethernet switch.

The node entity 400 may be implemented as a generic device, for example, a generic user terminal that allows users to connect external equipment. Alternatively, the node entity 400 may be a custom implementation addressing specific requirements, for example, on power, form factor, or cost.

Gateway terminal node entities may be implemented using a low cost architecture, and may have a similar architecture to that used for user terminal node entities. In this respect, low gateway terminal implementation cost may present an opportunity to deploy a large number of gateway terminals. A geographically disperse set of gateway terminals will provide reduced data latency between central applications and remote terminals, and reduce the storage requirements of the access nodes in the system 300 (ref. FIG. 3).

Figure 5:
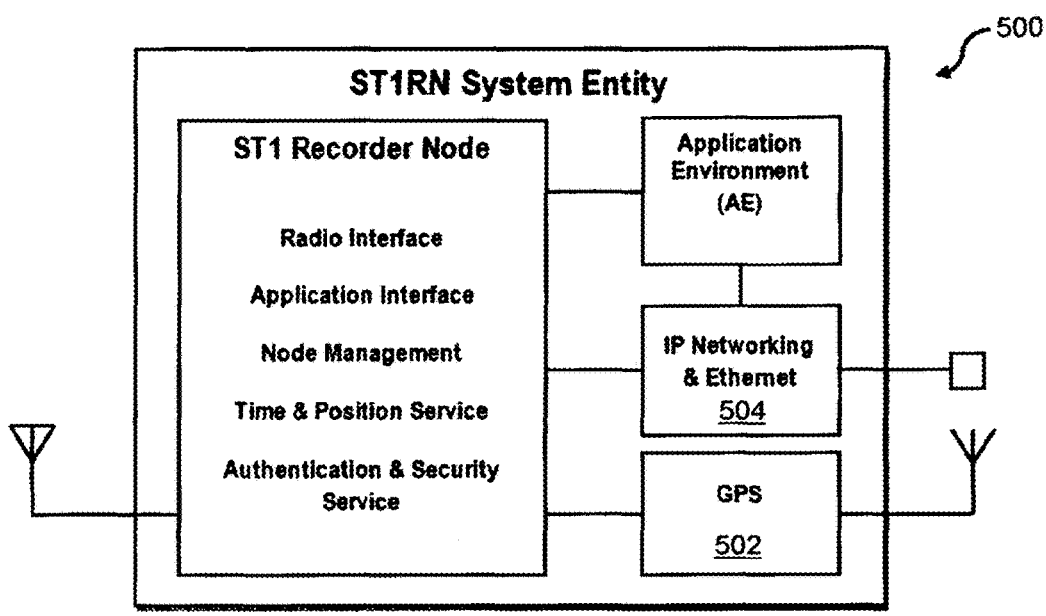
FIG. 5 is a functional block diagram for a ST1 recorder node suitable for use with a communication system in accordance with an embodiment of the present invention.

Turning now to FIG. 5 there is shown a functional block diagram for a ST1RN based system, entity 500 which implements an ST1 recorder node, as described above. As shown, the illustrated ST1 recorder node 500 includes a GPS receiver 502, providing time and position information to the node 500. The node 500 may also include a communications interface 504 (shown as an IP/Ethernet interface) providing external connectivity to the Node and Applications, and an application environment 506, as described above. Further input/output interfaces such as USB, RS-232, CAN, or other satellite system bus interface may also be provided. A user interface may also be provided.

Composite System Entities

In some embodiments, composite system entities may be provided which combine the functionality provided by one or more nodes. For simplicity, composite system entities are described here in terms of implementing multiple nodes. However, the implementation may exploit common features of the nodes in order to reduce complexity. For example, a single time and position service may be shared between two nodes within the same system entity.

In some embodiments a multi-mode gateway/access terminal (GAT) is provided which includes both gateway node and access node functionality in a terminal entity. A multi-mode gateway/access terminal may be terrestrially located, airborne, or space-based. A multi-mode gateway/access terminal may be located at a fixed location or be mobile, for example, on-board a vehicle, vessel, aircraft or spacecraft.

As described for the case of the gateway and access nodes, availability of a multi-mode gateway/access terminal connection to the hub 312 may be persistent or intermittent.

In one embodiment, a multi-mode gateway/access terminal may switch modes between providing access node functionality and gateway node functionality. Mode switching may be controlled by the multi-mode gateway/access terminal having knowledge of the location of other access nodes within the system 300 (for example, provided as by the hub 312), and thus making a decision on when to enable and disable the access mode of operation. In some instances, switching may be triggered by centralised mode control instructions initiated from the hub 312.

A multi-mode gateway/access terminal may detect the presence of a second access node, for example, by periodically listening for announcements on the radio interface. An access node may then use this knowledge to trigger the mode switch between access node 306 (Ref. FIG. 3) to gateway node 308 (ref. FIG. 3). If the multi-mode gateway/access terminal switches to gateway node mode it becomes a slave to the second access node as its master, and vice versa.

In another embodiment a multi-mode gateway/access terminal may simultaneously provide both access node and gateway node functionality.

Upon detecting each other, multiple multi-mode gateway/access terminals may negotiate the use of channel resources (slots) in order to co-exist and/or cooperate.

Figure 6:
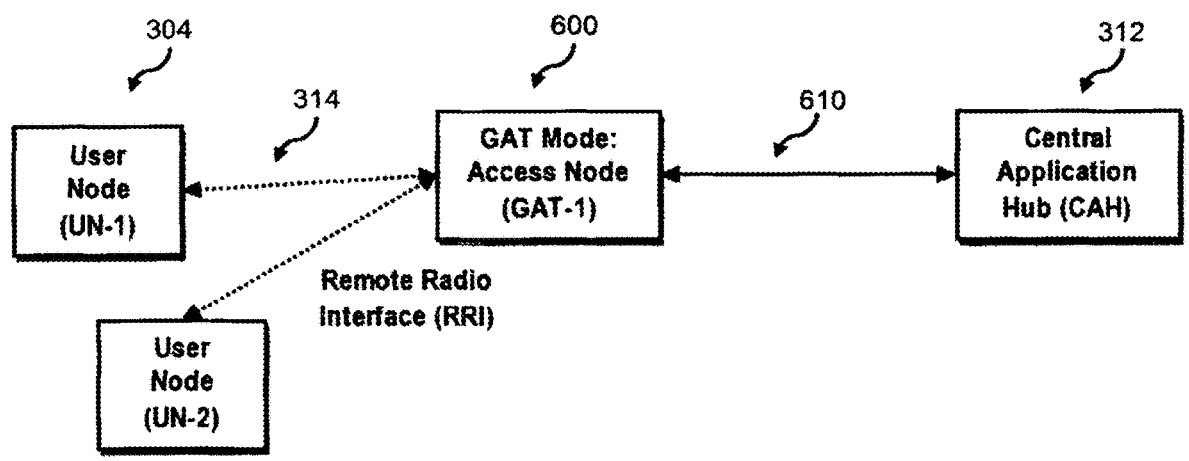
FIG. 6 is a block diagram for a system in accordance with an embodiment including a multimode gateway/access terminal operating in a access node mode in accordance with an embodiment of the present invention.

Turning now to FIG. 6 there is shown a first example configuration including a multi-mode gateway/access terminal 600 operating in a first mode. In this example, the multi-mode gateway/access terminal 600 operates in an access node mode, providing communications services to user nodes 304 that are in range via the remote radio interface 314. In the illustrated example, the multi-mode gateway/access terminal 600 also has an active connection to the hub 312, and may use this connection to communicate data from the user nodes 304 directly to the hub 312. The multi-mode gateway/access terminal 600 may also communicate messages from the hub to connected user nodes 304.

In the configuration shown in FIG. 6, if the multi-mode gateway/access terminal 600 does not have an active connection to the hub 312 it stores data coming from the user nodes 304 to be transferred to the hub 312 in the future. The multi-mode gateway/access terminal 600 may also forward previously stored messages from the hub 312 destined for the connected user nodes 304.

Figure 7:
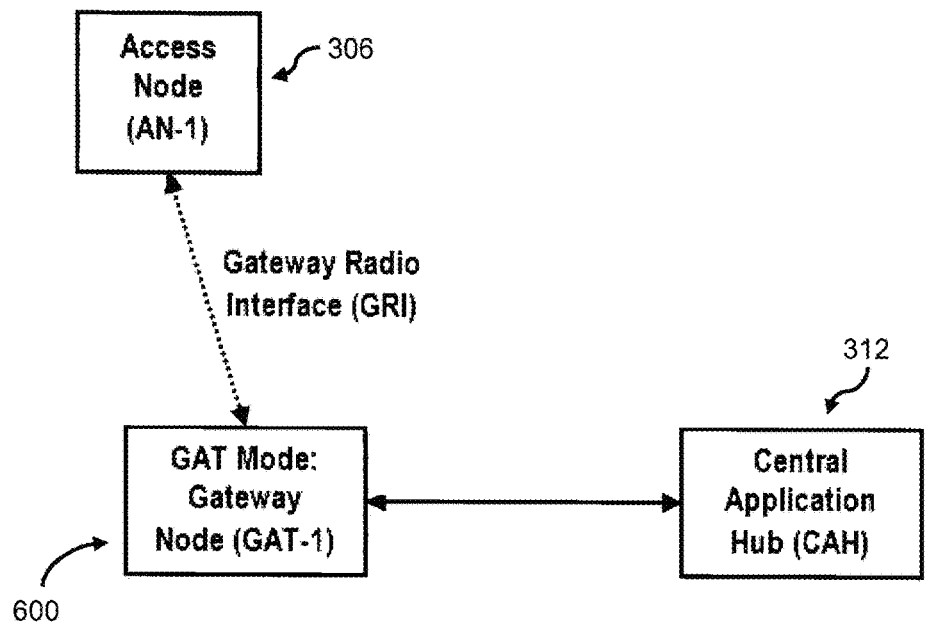
FIG. 7 is a block diagram for a communication system in accordance with an embodiment including a multimode gateway/access terminal operating in a gateway mode in accordance with an embodiment of the present invention.

Referring now to FIG. 7 there is shown a second example configuration including a multi-mode gateway/access terminal 600 operating in a second mode. In this example, the multi-mode gateway/access terminal 600 operates in a gateway node mode, providing communications services to the access node 306 that is in range via the gateway radio interface 316. In the illustrated example, the multi-mode gateway/access terminal 600 also has an active connection to the hub 312, and may use this to forward data from the access node 306 directly to the hub 312. The multi-mode gateway/access terminal 600 may also forward messages from the hub 312 to the connected access node 306.

In the illustrated configuration, if the multi-mode gateway/access terminal 600 does not have an active connection to the hub 312, it stores data coming from the access node 306 to be forwarded to the hub 312 in the future. The multi-mode gateway/access terminal 600 may also forward previously stored messages from the hub 312 that are destined for the access node 306, or destined for a user node (to be forwarded by the AN in the future).

Figure 8:
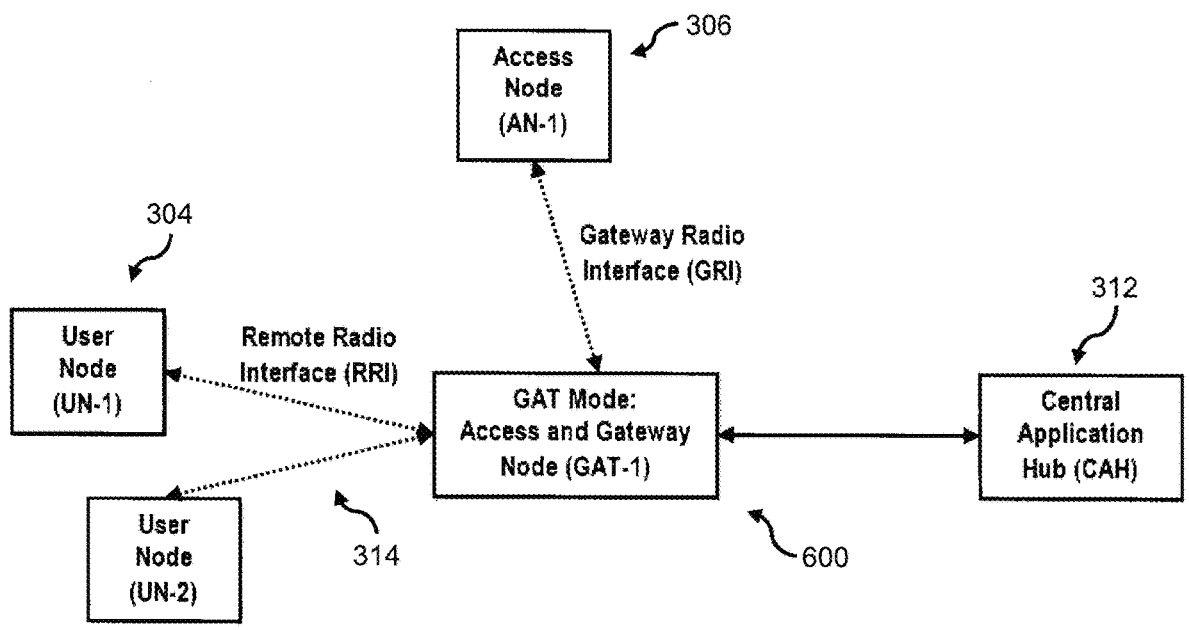
FIG. 8 is a block diagram for a system in accordance with an embodiment including a multimode gateway/access terminal simultaneously operating in a gateway node and an access mode.

FIG. 8 shows a third example configuration including a multi-mode gateway/access terminal 600 operating in a third mode which simultaneously provides access node and gateway node functionality. The multi-mode gateway/access terminal 600 is able to provide communications services to other access node entities (via the gateway radio interface 316) and user nodes (via the remote radio interface 314). In the example shown, the multi-mode gateway/access terminal 600 has an active hub connection and may use this to transfer data between the hub 312 and other connected entities.

In the configuration of the third example, as shown in FIG. 8, if the multi-mode gateway/access terminal 600 does not have an active connection to the hub 312 it stores data coming from the access node 700 to be forwarded to the hub 312 in the future. The multi-mode gateway/access terminal 600 may also forward previously stored messages from the hub 608 that are destined for the access node 700, or destined for user nodes 602, 604 (to be forwarded by the access node 700 in the future).

Figure 9:
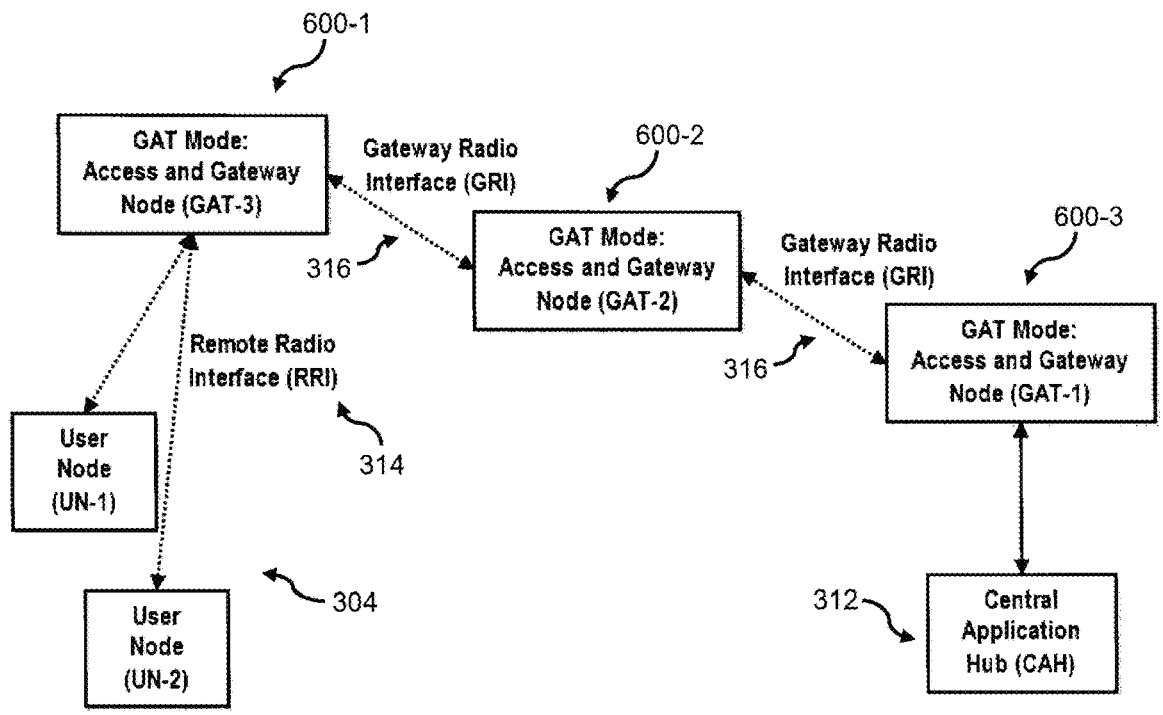
FIG. 9 is a block diagram for a system in accordance with an embodiment including plural multimode gateway/access terminals.

Turning now to FIG. 9 there is shown a fourth example implementation including three multi-mode gateway/access terminals 600-1, 600-2, 600-3. In this example, the three multi-mode gateway/access terminals 600-1, 600-2, 600-3 simultaneously provide access node and gateway node functionality and have coordinated access to share channel resources.

Gateway/access terminal 600-3 has an active connection to the hub 312. Gateway/access terminal 600-3 to gateway/access terminal 600-2 and gateway/access terminal 600-2 to gateway/access terminal 600-1 communications are provided via the gateway radio interface 316. Gateway/access terminal 600-1 also provides communications services to user nodes 304, via the remote radio interface 314. Through cooperative configuration of gateway/access terminals 600-1, 600-2, 600-3 it is possible to transfer data between the hub 312 and other connected entities through message hopping.

It will be appreciated that although the example illustrated in FIG. 9 includes three gateway/access terminals 600-1, 600-2, 600-3, the configuration may be extended through the addition of further gateway/access terminals 600.

Message hopping may also be performed across multiple gateway/access terminals 600 without requiring simultaneous connectivity as each node may implement the earlier described message storage function allowing it to store received messages and forward these messages at a later time. Moreover, while FIG. 9 shows the use of gateway/access terminals 600 operating in simultaneous access node and gateway node mode, it is possible that message hopping may be performed using the access node/gateway node mode switching gateway/access terminals described above.

Embodiments of the gateway/access terminals may provide the following benefits:

When operating in access mode, the gateway/access terminal can service communication requirements of user nodes within range. This may reduce user nodes requirements to communicate with a second access node when they are within its range, thus reducing load on the radio channel resource for the second access node;

When the gateway/access terminal has an active connection to the hub and is in access node mode it is able to provide low latency communication between the hub and the user nodes within range of the gateway/access terminals; and The gateway/access terminals enables message hopping across entities.

Composite system entities may be constructed by including multiple nodes into any system entity. For example, the gateway node and access node may be implemented within any system entity that is selected to provide a point of access into the system, such as a satellite payload, cellular base station, or wireless access point. In such cases, the resulting combination of the access node and gateway node may provide the same benefits as described for the gateway access terminal.

The Central Host Entity

Figure 10:
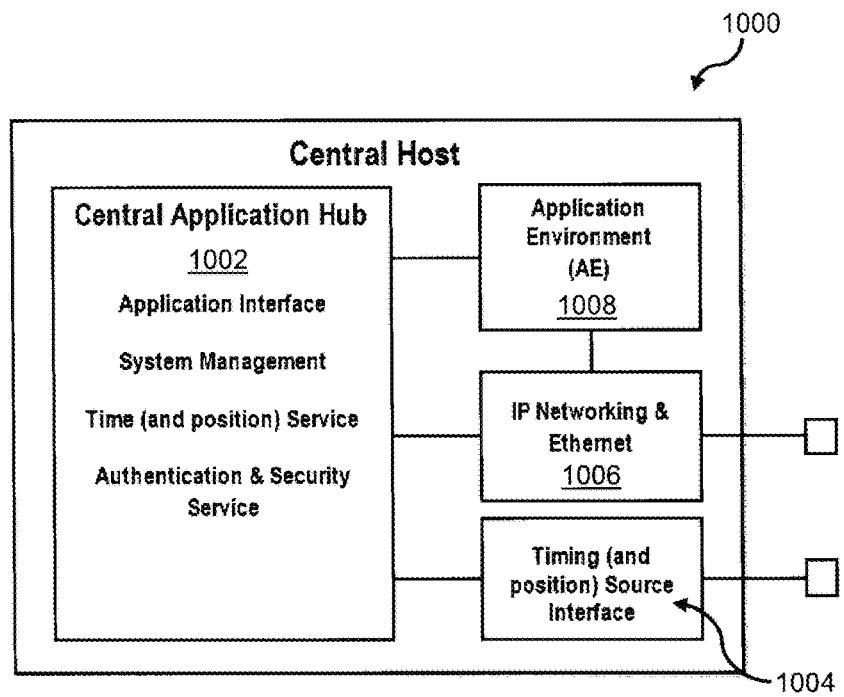
FIG. 10 is a functional block diagram for a central host suitable for use with a system in accordance with an embodiment of the present invention.

FIG. 10 shows a functional architecture for the central host 1000 system entity. As shown, the entity 1000 implements a central application hub functional network entity 1002, as described above, a timing source input interface 1004 providing time (and potentially position) information, a communications interface 1006 (shown here as an IP/Ethernet interface) providing system and external connectivity. An optional application environment 1008 allowing for the execution of central applications may also be provided.

The central application hub 1002 may be implemented in software running on a computing platform that provides, for example, IP connectivity, for example, a PC or server platform. The same platform may be used to host central applications.

The timing source input interface 1004 may source information from a GPS. In this case position information may also be provided to the central application hub 1002. The timing source input interface 1004 may also be provided via the IP network interface, for example, coming from a time server computer.

The central host 1000 may also implement additional features, such as a user interface, further input/output interfaces (for example, USB, RS-232), and an Ethernet switch.

Example Implementation

The following description relates to embodiments of a communications system according to the present invention in the context of a satellite communications system.

Figure 11:
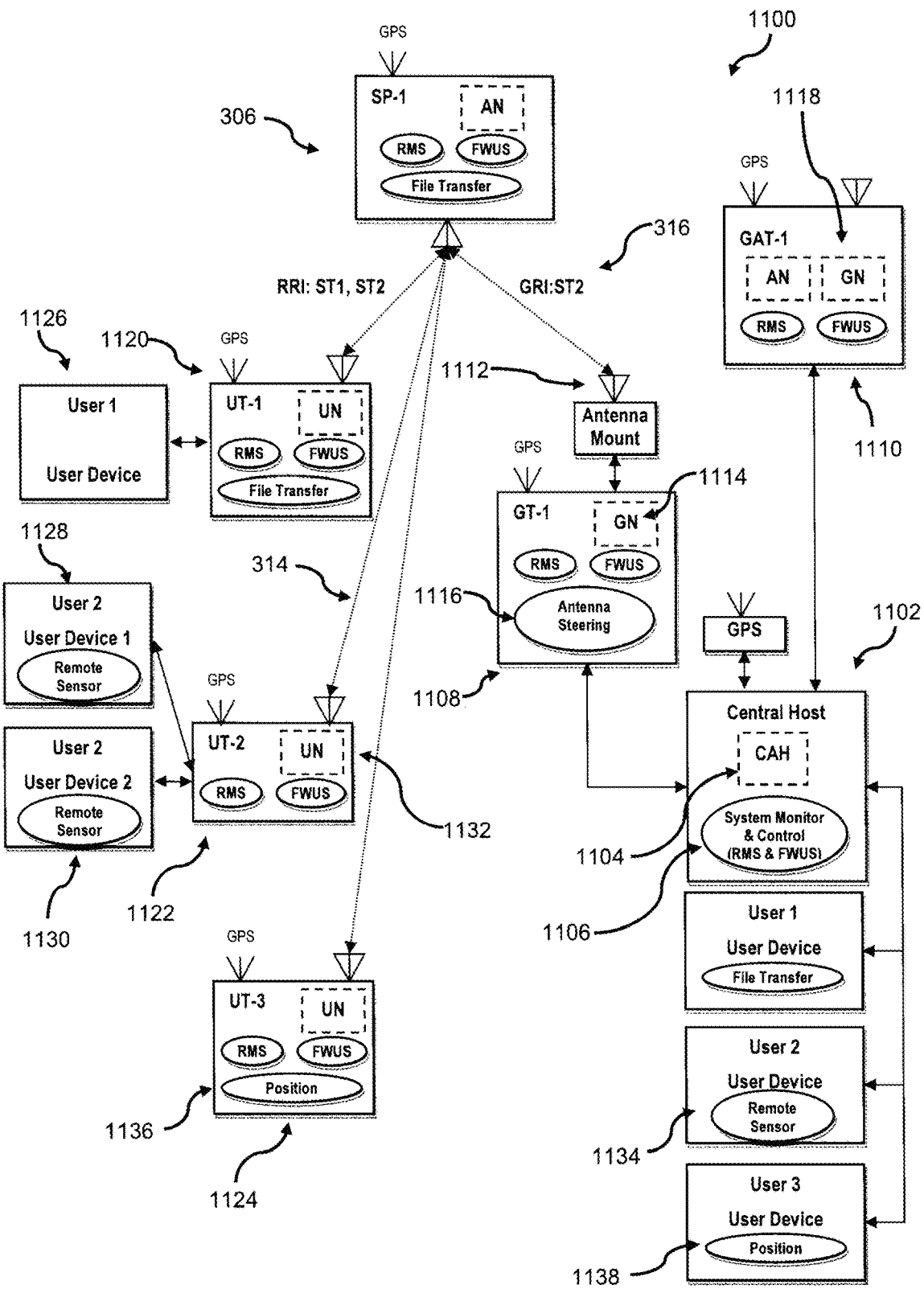
FIG. 11 is a system block diagram for an example implementation of a system in accordance with an embodiment of the present invention.

FIG. 11 shows an example scenario pertaining to a preferred embodiment of the communication system 1100. For clarity, FIG. 11 illustrates only a small number of system entities, applications, and system users. The functionality of each entity is described above. System entities are shown as solid lined boxes; functional network entities (nodes) as dashed boxes; and applications as ellipses.

In the preferred embodiment, the communications system 1100 includes one or more satellites in Low Earth Orbit (LEO). Other orbits may also be employed, such as Medium Earth Orbit (MEO) and Geostationary Earth Orbit (GEO). Moreover, the system 1100 may include multiple satellites, having a mixture of orbit types.

As will be appreciated by a skilled reader, satellites are equipped with one or more satellite payloads (SP). In the preferred embodiment, the satellite payload is an access node based system entity, as described above. Hence, in the embodiment illustrated in FIG. 11, access node 306 is provided as satellite payload equipment. The satellite payload equipment may also include interfaces to communicate with the satellite system, for example, via the system bus.

In the preferred embodiment, radio interfaces 314 and 316 are provided using UHF and/or VHF spectrum. In the illustrated example the radio interface 314 correspond to the remote radio interfaces of the type previously described, whereas radio interface 316 corresponds to a gateway radio interface of the type previously described. It is to be appreciated that the system 1100 may employ multiple radio channels, and may re-assign their use during operation, as described above.

In one embodiment, radio interface uplink and downlink operations performed over the radio interfaces 314, 316 are performed in a full-duplex mode on multiple frequencies. In another embodiment, the uplink and downlink operation are performed on the same frequency via time division duplex. In another embodiment, the system 1100 is flexible to allow uplink and downlink time division or frequency division duplex operation.

The central host 1102 system entity is implemented as described above. In the preferred embodiment a GPS is input as the timing source. Other embodiments may receive timing information from a networked time server computer, as previously described.

As shown, the central host 1102 includes the central application hub 1104, and also provides a system monitoring and control application 1106. In this example, the system monitoring and control application 1106 provides the central application programs (CA) to the system node management applications. System nodes may run node management applications, as previously described.

In the embodiment shown, each node runs the firmware upgrade service (FWUS) and remote management service (RMS) also as described above.

In the preferred embodiment, one or more gateway terminals 1108, 1110 are connected to the central host 1102 via a suitable communications interface which may include an Ethernet/IP connection. In the present case, gateway terminal 1108 is connected to an electronically controlled steerable antenna mount 1112. The gateway node 1114 of the gateway terminal 1108 determines the location of the access node 306 from incoming access node announcement messages, and forwards this information to an antenna steering application 1116 running on the gateway terminal 1108. The application 1116 then extracts position information for the access node 306 and directs the antenna 1112 in order to maximise link quality. In another embodiment a gateway terminal may employ one or more omnidirectional antennas.

In other embodiments, applications may run on external devices that are connected to the gateway terminals 1108, 1110. Connection between gateway nodes 1114, 1118 and the central application hub 1104 may not be persistent, as described above.

Gateway terminals 1108, 1110 communicate with the access node 306 via the gateway radio interface 316. In the preferred embodiment the gateway radio interface 316 is provided by a Service Type 2 (ST2) bi-directional radio interface. Other embodiments may provide the gateway radio interface 316 via alternate means, as described above.

The access node 306 shown in FIG. 11 runs a file transfer access node application, as described above.

User terminals 1120, 1122, 1124 communicate with the access node 306 via the remote radio interface 314. In the preferred embodiment the remote radio interface 314 includes both a Service Type 1 (ST1) unidirectional radio interface and a Service Type 2 (ST2) bi-directional radio interface. However, it is to be appreciated that other embodiments may provide only one of these interfaces.

Three user terminals 1120, 1122, 1124 are shown in FIG. 11. User terminals 1120, 1122 communicate with a respective user device 1126, 1128, 1130. In the present case, user device 1126, 1128, 1130 to user terminals 1120, 1124 connections are provided using an Ethernet/IP communication interface. However, other suitable communication interfaces may be employed. Suitable communication interfaces would be well within the knowledge of a skilled addressee.

In the case of user device 1126, a remote application program on the user device 1126 is executed to provide file transfer services, as described above, and forwards the file to the connected user terminal 1120. User device 1126 uses the ST2 service to support this service. The corresponding central application is connected to the central application hub 1104 via the central host 1102.

User terminal 1122 allows multiple user devices 1128, 1130 to interface to user node 1132 via, for example, an Ethernet switch. In this example, two sensor user devices ("User Device 1" and "User Device 2") are connected, each running a remote sensing remote application as described above. User terminal 1122 may use the ST2 service to support this application; or the ST1 service if feedback is not required from the associated central application 1134 to the remote sensing remote application program on user devices 1128, 1130. In the present case, the corresponding remote sensing central application 1134 is connected to the central application hub 1104 via the central host 1102.

In the illustrated example, the user terminal 1124 executes a position report remote application 1136 that allows the corresponding central application 1138 to report the position of this terminal (and others like it) to a user ("User 3"). User terminal 1124 may use either the ST1 or ST2 service to support this application.

In the preferred embodiment gateway access terminals are also deployed in regions where user terminals are expected to be in range, either permanently or momentarily. The connection between gateway access terminals and the central application hub 1104 may be persistent or intermittent, as described above. Gateway access terminals may employ one or more directional or omnidirectional antennas, or a combination of one or more directional or omnidirectional antennas. In one embodiment, the gateway access terminal employs one or more directional antennas for the gateway radio interface when providing gateway node functionality, and one or more omnidirectional antennas for the remote radio interface when providing access node functionality. In another embodiment the gateway access node employs one or more omnidirectional antennas to support both remote and gateway radio interfaces. The use of omnidirectional antennas offers potential benefits of reduced system cost, deployment and maintenance requirements.

In another embodiment a geographically disperse set of gateway terminals and/or gateway access terminals is deployed in order to increase the duration of connectivity between gateways and satellite payloads, and reduce data transfer latency between the central host 1102 and other system entities.

In another embodiment, when in range of both ST2 User Terminal and Gateway Node, the satellite may operate in two-way mode, either regenerative, or bent-pipe.

In another embodiment access node based system entities may be deployed terrestrially, or be airborne, in order to service user terminals. The connection between access nodes and the central application hub 1104 may be persistent or intermittent, as described above.

In the preferred embodiment system entities are implemented using fully or partially reconfigurable devices, such as software defined radios, that are capable of supporting multiple applications and multiple frequency bands. In other embodiments, fixed architecture devices may be used.

In another embodiment, the access node (which in this case is the satellite payload) is a Service Type 1 Recorder Node (ST1RN) based system entity as described above. In this case the ST1 service is implemented by receiving and recording the ST1 Remote Radio Interface channel using the ST1RN. The recorded channel data is then transmitted to the ground via the Gateway Radio Interface. Digital signal processing of the channel data is then performed, and resulting messages are forwarded to the central application hub 1104.

In another embodiment the satellite payload includes both the access nodes and ST1RN nodes, allowing it to process data while in orbit and/or record channel samples for ground based processing.

In another embodiment the satellite payload includes an access node and gateway node entity. In this embodiment the satellite may be able to support message hopping, as described above for the case of a gateway access terminal (which also implements both access node and gateway node). In this embodiment inter-satellite-links (ISLs) may be formed. In another embodiment the GRI is implemented to be compatible with a third party satellite service provider, thus allowing such services to be used to link the space and ground segments of the described architecture.

The described embodiments may also include the authentication and security services as described above.

Compact Antenna

Applications such as tracking and sensing, may require a small form factor terminal implementation, thus requiring a compact antenna.

In a preferred embodiment the compact antenna is a coil of conductive metal having total length equal to one quarter of the wavelength at the transmit frequency. The coil may in one embodiment be constructed from wire of a variety of alloys but may also be of gold or other suitably conductive single element, or in another be manufactured onto a printed circuit board using the conductive circuit track material on the board as the antenna element.

In a preferred embodiment, the antenna is fed at an end of the antenna. The preferred feed end is located at the centre of a coil having a spiral shape in a single plane.

In a preferred embodiment a ground plane is used that has similar area dimension to the coil located in a plane parallel to the plane of the antenna.

During deployment (positioning of) the terminal is such that the electrically conductive surface of the ground plane is located facing away from the intended direction of radiation. For example, in the case of a satellite system the antenna associated with the terminal is best oriented such that the ground plane is on the Earth side of the in orbit satellite. The flat coil antenna including the ground plane enables the associated terminal (including the antenna) to have a compact tag-like form factor.

In a preferred embodiment, labelled Case-A, for a transmit frequency of 162.725 MHz the length of the coil is approximately 46 cm. The coil consists of between 1 and 4 self-enveloping loops, with side dimensions across the substantially planar coil formation being in one embodiment approximately 4.5 cm by 6.5 cm.

A short section of the feed portion of the antenna connects the coil, between the feed point located generally central to the planar coil to the edge region of the planar coil. The feed portion of the antenna runs at an angle (labelled α in FIG. 13) of approximately 45 degrees to the side of the planar coil. The feed portion is separated from the conductive plane of the coil so as not to make contact with any part or portion of the coil, as can be seen from the top view in FIG. 13. The feed portion is connected between the free end of the depending part of the coil and the centre conductor of a co-axial cable located near one of the sides of the planar coil. As described above the ground plane has similar planar dimension to the coil and is mounted in the same plane as the coil, and connected to the shield (outer conductor) of the coaxial cable. The co-axial cable is used to feed radio frequency signal to the antenna.

An embodiment of the compact antenna described above is depicted in FIG. 13 (front and top down views).

Figure 14:
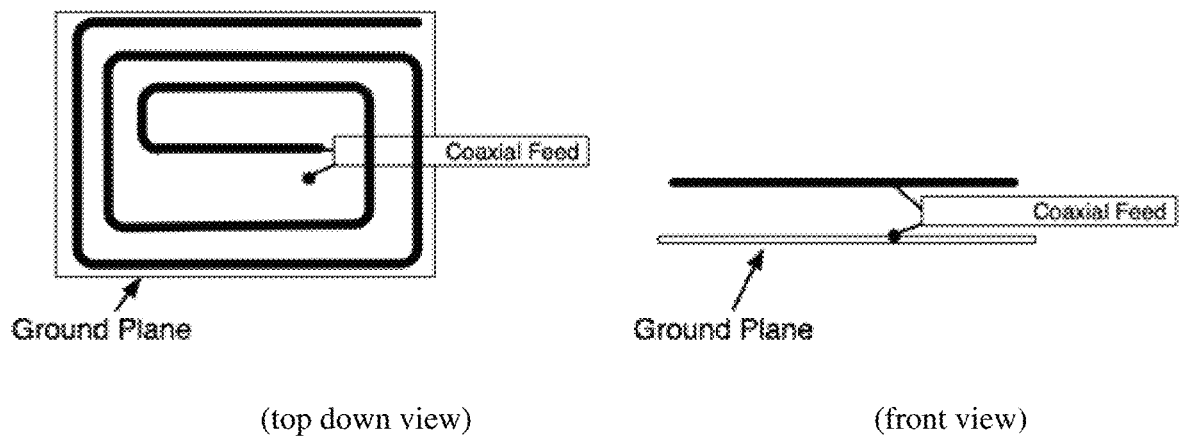
FIG. 14 depicts a further embodiment of a compact antenna.

In another embodiment, one end of the antenna structure begins at the centre of the coil, and the signal feed is connected to the antenna at this point. The ground plane again has similar dimensions as the coil. The ground plane is mounted such that the plane of the antenna and the plane of the ground plane are parallel with a physical separation between the coil and the ground plane. The outer shield of the coaxial cable is connected to the ground plane. A predetermined separation between the coil and ground plane is provided, with separation distance depending upon the permittivity of the medium located between the two planes and the frequency of operation of the antenna. In one embodiment, that of free space, the distance may be of the order of 1 to 2 cm. In another embodiment the space may be used to house components of the terminal, thus changing the permittivity. This embodiment of the compact antenna is shown in FIG. 14 (front and top down views).

Figure 13:
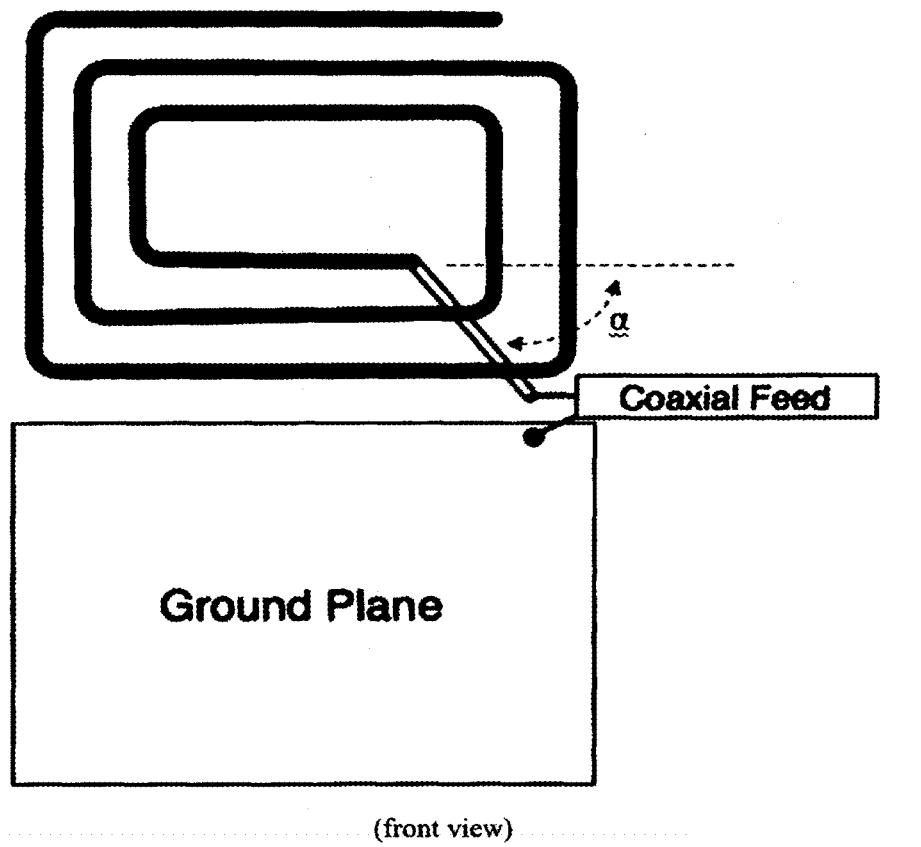
FIG. 13 depicts one embodiment of a compact antenna.
Figure 13:
Figure 15:
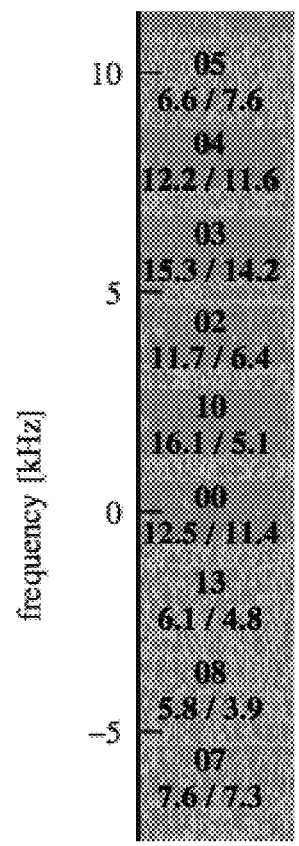
FIG. 15 depicts test results including SNR measurements.

In order to compare the performance of the compact antennas described above to that of some commercial off-the-shelf monopole antennas, an experiment was conducted during which several collocated prototype terminals were setup to transmit to a satellite in low earth orbit. Packets were transmitted using the ST1-PHY described above. The transmit frequency was 162.725 MHz and the terminal output power was 32 mW (15 dBm). FIG. 15 shows a spectrogram of the signal received at the satellite during a single time slot of 250 ms duration. Packets were successfully received from 9 terminals, and each packet shown indicates the terminal identifier along with the received SNR (measured/estimated) in dB. Terminal 02 was used with the antenna depicted in FIG. 14 being a compact antenna orientated horizontally. Terminal 03 used an antenna as depicted in FIG. 13 being a compact antenna orientated vertically. Terminal 04 also used an antenna as disclosed in FIG. 13 being a compact antenna orientated vertically, however rotated in azimuth by 90 degrees with respect to the antenna used by Terminal 03. The other terminals used off-the-shelf monopole antennas. The test results as illustrated in FIG. 15 show that SNRs measured for packets received from the compact antennas were similar to, or greater than, SNRs measured for the off-the-shelf monopole antennas.

The tests described were conducted in the VHF band at 162.725 MHz. The antenna design is also expected to be applicable to other frequencies, including other VHF frequencies, and frequencies in the UHF band. As described above the antenna may be tuned to a particular frequency through selection of the coil length. The coil length is chosen to be equal to one quarter of the wavelength, hence it is expected that higher frequencies will permit more compact antenna dimensions.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention.

The invention claimed is:

1. A communication system, including:
    a plurality of user nodes, each user node is operatively connected to one or more remote application programs which generate message data for communication to one or more central application programs operatively associated with the one or more remote application programs and each user node further comprises a user node communications interface configured to transmit data including the message data using a third party communication protocol;
    a plurality of gateway nodes, wherein the gateway nodes are distributed in the air or in space;
    a hub for communicating with the plurality of gateway nodes to receive the message data for communication to the one or more central application programs; and
    at least one terrestrial access node for receiving the message data from at least one of the plurality of user nodes via a first communications interface, and the at least one terrestrial based access node communicates the message data to at least one of the plurality of gateway nodes via a second communications interface,
    wherein, the at least one terrestrial access node is configured such that the first communications interface implements a third party communication protocol stack providing at least a Physical Layer, and the at least one terrestrial access node is configured to provide system access to application programs which communicate via the third party communication protocol stack via an application layer that provides an interface to the third party communication protocol stack.

2. The communication system as claimed in claim 1, wherein the second communications interface is an intermittent interface.

3. The communication system as claimed in claim 1, wherein one or more of the plurality of user nodes is connected to one or more user devices executing one or more of the one or more remote application programs that generate the message data and provide the message to the connected user node for transmission using the user node communications interface of the user node.

4. The communication system as claimed in claim 1, wherein one or more of the plurality of user nodes comprises a processor configured to execute one or more application programs that generate the message data.

5. The communication system as claimed in claim 4, wherein the one or more of the plurality of user nodes are a sensor apparatus comprising a sensor, and the one or more application programs comprises a sensor network application program configured to collect and process data from the sensor, and to provide message data for transmission by the user node communications interface using the third party communication protocol.

6. The communication system as claimed in claim 1, wherein the one or more remote application programs comprise one or more of a sensor network application program, an environmental monitoring remote application program, an asset monitoring remote application program, a remote application program for processing and/or forwarding of data within a SCADA system; a remote application program for monitoring and controlling local equipment in response to operational commands issued by a corresponding central application; a remote application program for object position reporting, and a remote application program for delivering system services applications.

7. The communication system as claimed in claim 1, wherein the communication system implements authentication of user nodes, access nodes and gateway nodes, so that only an authorized user node is granted access to the first radio interface, and that only an authorized terrestrial access node is granted access to the second radio interface.

8. The communication system as claimed in claim 1, wherein each of the first radio interface and the second radio interface implement link level encryption.

9. The communication system as claimed in claim 1, wherein the remote application programs generates a message authentication code which is used to authenticate received message data, and the data further comprises the message authentication code.

10. The communication system as claimed in claim 1, wherein the system further comprises a trusted Certificate Authority that issues and signs keys, and the one or more terrestrial access nodes authenticate message data received from one of the plurality of user nodes using a certificate issued from the Certificate Authority.

11. The communication system as a claimed in claim 1, wherein the one or more terrestrial access nodes compresses data prior to transmission to the plurality of gateway nodes.

12. The communication system as a claimed in claim 1, wherein the user node compresses data prior to transmission to the one or more terrestrial access nodes.

13. The communication system as claimed in claim 1, wherein the one or more terrestrial access nodes receive centralized network access control instructions setting network access rights from the hub.

14. The communication system as claimed in claim 1, wherein the second communications interface is a 1 way interface, and the at least one terrestrial access node is configured to use a rateless coding scheme to transmit coded packets to the plurality of gateway nodes.

15. The communication system as claimed in claim 14, wherein the plurality of gateway nodes are configured to forward received coded packets to the hub where they are decoded.

16. The communication system as claimed in claim 1, wherein the at least one user node is configured to provide a protected application environment for running one or more application programs to separate core functionality from the one or more remote applications program to protect core functionality in the event of application failure of the one or more remote applications programs.

17. The communication system as claimed in claim 1, wherein the at least one terrestrial access nodes is configured to provide a message storage function which stores message data received from the plurality of user nodes for communication to the one or more of the central application programs from one or more remote applications.

18. The communication system as claimed in claim 1, wherein at least one of the first communications interface and the second communications interface operate in the range 30 MHz to 1 GHz.

19. The communication system as claimed in claim 1, wherein one or more of the central application programs further comprises an application program configured for execution on a user device.

20. The communication system as claimed in claim 1, wherein one of the one or more of the remote application programs is registered to one of the one or more user nodes, and the remote application transmits data messages to the associated central application program via the user node with which it has registered.

21. The communication system as claimed in claim 1, wherein the one or more gateway nodes communicate with the hub using one or more inter-satellite links.

22. The communication system as claimed in claim 1, wherein atleast one of the one or more terrestrial access nodes comprises a cellular base station or a wireless access point.

23. The communication system as claimed in claim 1, wherein the hub is further configured to receive data from the one or more central application programs for communication to the one or more remote application programs and communicates the received data to one or more of the plurality of gateway nodes that transmit the data over the second communications interface to the at least one terrestrial access node that transmits the data to the one or more user nodes over the first communications interface for communication to the one or more remote application programs.

24. The communication system as claimed in claim 23, wherein the central application program is configured to perform remote management and control of the associated remote application program.

25. The communication system as claimed in claim 24, wherein the data from the one or more central application programs for communication to the one or more remote application programs comprises one or more commands for controlling, managing, monitoring, configuring, or updating the associated remote application program.

26. A method of communication, comprising:
receiving, by one of a plurality of user nodes, data from one or more remote application programs via an application layer that provides an interface to a third party communication protocol stack providing at least a Physical Layer, the data including message data for communication to one or more central application programs operatively associated with the one or more remote application programs;
receiving, by one or more terrestrial access nodes, message data from the user node via a first communications interface that implements the third party communication protocol stack, and communicating the message data via a second communications interface to one or more of a plurality of gateway nodes distributed in the air or space wherein the at least one terrestrial access node implements an interface that enables system access to remote application programs configured to communicate via the third party communication protocol; and
receiving, by a hub, message data from one or more of the plurality of gateway nodes and providing the message data to the one or more central application programs.

27. The communication system as claimed in claim 1, wherein the third party communication protocol stack provides both a Medium Access Control Layer and the Physical Layer.

28. The communication system as claimed in claim 1, wherein the third party communication protocol is at least one of Distributed Network Protocol (DNP3) or Modbus.

29. The method of communication as claimed in claim 26, wherein the third party communication protocol stack provides both a Medium Access Control Layer and the Physical Layer.

30. The method of communication as claimed in claim 26, wherein the third party communication protocol is at least one of Distributed Network Protocol (DNP3) or Modbus.

\* \* \* \* \*